US011225791B2

(12) United States Patent
Gosling

(10) Patent No.: US 11,225,791 B2
(45) Date of Patent: Jan. 18, 2022

(54) FOLDABLE MODULAR WALL SYSTEMS

(71) Applicant: DIRTT ENVIRONMENTAL SOLUTIONS, Ltd., Calgary (CA)

(72) Inventor: Geoff W. Gosling, Calgary (CA)

(73) Assignee: DIRTT ENVIRONMENTAL SOLUTIONS LTD., Calgary (CA)

( * ) Notice: Subject to any disclaimer, the term of this patent is extended or adjusted under 35 U.S.C. 154(b) by 85 days.

(21) Appl. No.: 16/469,062

(22) PCT Filed: Feb. 2, 2018

(86) PCT No.: PCT/US2018/016724
§ 371 (c)(1),
(2) Date: Jun. 12, 2019

(87) PCT Pub. No.: WO2018/144932
PCT Pub. Date: Aug. 9, 2018

(65) Prior Publication Data
US 2019/0309512 A1 Oct. 10, 2019

Related U.S. Application Data

(60) Provisional application No. 62/454,554, filed on Feb. 3, 2017.

(51) Int. Cl.
*E04B 2/82* (2006.01)
*E04B 2/74* (2006.01)
(Continued)

(52) U.S. Cl.
CPC .............. *E04B 2/827* (2013.01); *E04B 2/7403* (2013.01); *E05D 15/26* (2013.01); *H02G 3/388* (2013.01);
(Continued)

(58) Field of Classification Search
CPC ........ E04B 2/827; E04B 1/343; E04B 2/7403; E04B 2002/7488; E04B 1/7038; E05Y 2900/142; H02G 3/388; E05D 15/26
(Continued)

(56) References Cited

U.S. PATENT DOCUMENTS 2,151,033 A * 3/1939 Jones ....................... E06B 3/481
160/40
2,860,701 A * 11/1958 Wood ..................... E05D 15/266
160/199

(Continued)

OTHER PUBLICATIONS

Certificate of Correction for U.S. Pat. No. 3,799,237, Mar. 26, 1974, 1 Page.
(Continued)

*Primary Examiner* — Beth A Stephan
(74) *Attorney, Agent, or Firm* — Workman Nydegger

(57) ABSTRACT

A foldable modular wall system includes a track, one or more stationary wall modules, and one or more foldable wall modules. The foldable wall modules are pivotally and slidably connected to the track such that the foldable wall modules can be selectively moved between a closed confirmation and an open configuration. The foldable modular wall system can also include power hinge jumpers through which electrical wires can nm to power electronic components embedded in or disposed on the foldable wall modules.

29 Claims, 22 Drawing Sheets

(51) Int. Cl.
*E05D 15/26* (2006.01)
*H02G 3/38* (2006.01)
(52) U.S. Cl.
CPC . *E04B 2002/7488* (2013.01); *E05Y 2900/142* (2013.01)
(58) Field of Classification Search
USPC .......................................................... 160/127
See application file for complete search history.

(56) References Cited

U.S. PATENT DOCUMENTS

| | | | | |
|---|---|---|---|---|
| 2,894,573 | A * | 7/1959 | Rosenfeld | E06B 3/481 |
| | | | | 160/84.04 |
| 3,295,588 | A | 1/1967 | Gilson | |
| 3,335,784 | A * | 8/1967 | Risk | E05D 15/264 |
| | | | | 160/199 |
| 3,570,200 | A | 3/1971 | Ritner | |
| 3,799,237 | A | 3/1974 | Proserpi, I | |
| 3,856,981 | A | 12/1974 | Boundy | |
| 4,658,878 | A * | 4/1987 | Williams | E06B 3/94 |
| | | | | 160/84.09 |
| 5,537,290 | A | 7/1996 | Brown et al. | |
| 6,851,226 | B2 * | 2/2005 | MacGregor | A47B 83/001 |
| | | | | 52/220.7 |
| 7,228,664 | B2 | 6/2007 | Clark | |
| 8,967,225 | B2 * | 3/2015 | Coleman | E06B 1/60 |
| | | | | 160/199 |
| 9,163,451 | B1 * | 10/2015 | Curry | E05D 15/08 |
| 2004/0064985 | A1 | 4/2004 | Lenz | |
| 2010/0132895 | A1 | 6/2010 | Logue | |
| 2010/0192493 | A1 | 8/2010 | Nakai | |
| 2011/0197519 | A1 * | 8/2011 | Henriott | E04B 2/7433 |
| | | | | 52/36.1 |
| 2011/0296761 | A1 | 12/2011 | Wood et al. | |
| 2012/0083147 | A1 | 4/2012 | Welch et al. | |
| 2012/0117881 | A1 * | 5/2012 | Seymour | E05F 17/004 |
| | | | | 49/130 |
| 2012/0318467 | A1 * | 12/2012 | Levin | E04B 2/827 |
| | | | | 160/194 |
| 2014/0075871 | A1 * | 3/2014 | Haan | E04B 2/721 |
| | | | | 52/309.1 |
| 2014/0352220 | A1 * | 12/2014 | Rees | H04L 12/4633 |
| | | | | 49/164 |
| 2014/0367056 | A1 * | 12/2014 | Miller | E05D 3/12 |
| | | | | 160/229.1 |
| 2016/0076291 | A1 * | 3/2016 | Kleiman | E06B 3/481 |
| | | | | 160/197 |
| 2016/0177565 | A1 * | 6/2016 | Aykas | E04B 1/7038 |
| | | | | 52/64 |
| 2017/0218683 | A1 * | 8/2017 | Shanahan | E06B 3/4636 |
| 2018/0230728 | A1 * | 8/2018 | Downey | E05F 5/003 |
| 2018/0258676 | A1 * | 9/2018 | Rebarchek | E05F 15/643 |
| 2019/0309512 | A1 | 10/2019 | Gosling | |
| 2019/0360200 | A1 * | 11/2019 | Sloss | E06B 3/481 |
| 2020/0002984 | A1 * | 1/2020 | Svenson | E06B 9/0638 |
| 2020/0018572 | A1 * | 1/2020 | Gonzales | E06B 3/481 |

OTHER PUBLICATIONS

European Search Report and Opinion for EP Application No. 18748021.5, dated Oct. 8, 2020, 9 pages.
International Search Report and Written Opinion dated Apr. 24, 2018 from International Patent Application No. PCT/US2018-016724, filed Feb. 2, 2018.

* cited by examiner

FOLDABLE MODULAR WALL SYSTEMS

CROSS-REFERENCE TO RELATED APPLICATIONS

This application is a national stage of International Patent Application No. PCT/US2018/016724, filed on Feb. 2, 2018, which claims priority to U.S. Provisional Patent Application No. 62/454,554, filed Feb. 3, 2017. The entire content of each of the aforementioned patent applications is incorporated herein by reference.

BACKGROUND

Technical Field

Implementations of the present invention relate generally to systems, methods, and apparatus used to connect adjacent wall modules together, such that the adjacent wall modules can be folded relative to one another.

Background and Relevant Art

Office space can be relatively expensive, not only due to the basic costs of the location and size of the office space, but also due to any construction needed to configure the office space in a particular way. For example, an organization might purchase or rent a large open space in an office complex, and then subdivide or partition the open space into various offices or conference rooms depending on the organization's needs and size constraints. Some organizations will prefer to build permanent walls and structures to partition the space, which can be prohibitively expensive and time consuming. Accordingly, other organizations will partition the space with modular assemblies. Modular assemblies can be relatively easy to assembly. Additionally, if the needs of the organization change, the modular assemblies can be disassembled and reassembled in a different configuration.

For example, modular office partitions typically include a series of individual wall modules (or panels) that can be immediately placed into a particular partition position to create at least an outline of a cubicle, office, or conference room. That is, a manufacturer or assembler can typically take a given set of wall modules, and align the wall modules along a floor pattern until the desired configuration is achieved. The manufacturer can then secure the given wall modules in position. The assembled partitions can be either free-standing, or can be rigidly attached to the permanent support structures. A "finished" look is generally completed by adding trim pieces in the joints between panels or wall modules.

While modular systems can be disassembled and reconfigured more quickly and less expensively compared to remodeling permanent walls and structures, such process can still be time-consuming. Furthermore, there are times when it is desirable to temporarily divide a space or undivide multiple spaces. For instance, it may be desirable to temporarily divide a conference room into multiple smaller conference rooms and then undivide the space to provide for a single large conference room. It can be impractical or impossible to use existing modular wall systems for such temporary solutions due to the cost and time associated with adding or removing a modular wall to either divide or undivide a space. For example, it may be difficult to integrate the necessary components of a foldable wall or curtain into the framework of modular wall systems.

Accordingly, there remains room for improvement in the area of dividing interior spaces. In particular, there remains room for improvement in terms of modular wall systems with partitions that can be opened or closed to either undivide or divide a space.

BRIEF SUMMARY

The present disclosure relates to foldable modular wall systems that allow a space to be selectively divided into multiple smaller spaces. In one embodiment, such a modular system includes a track, one or more stationary wall modules, and one or more foldable wall modules. The one or more foldable wall modules are pivotally and slidably connected to the track such that the one or more foldable wall modules can be selectively moved between a closed configuration and an open configuration.

In some embodiments, the one or more foldable wall modules include at least two foldable wall modules that are hingedly connected to one another. At least one of the two foldable wall modules can include a attachment feature that is configured to selective maintain the foldable wall modules in the closed configuration. The attachment feature can include one or more magnets connected to one or more vertical supports of the at least one of the two foldable wall modules.

The foldable wall modules are hingedly connected to one another to enable the wall modules to fold and unfold between the open and closed configurations. Additionally, one of the foldable wall modules may be hingedly connected to a first stationary wall module of the one or more stationary wall modules.

In some embodiments, at least one foldable wall module of the one or more foldable wall modules includes a selectively extendable end cap. The end cap is connected to a vertical support of the at least one foldable wall module by an extension bracket, which includes a first connection bracket connected to the end cap, a second connection bracket connected to the vertical support, and a hinge connector hingedly connected between the first and second connection brackets.

BRIEF DESCRIPTION OF THE DRAWINGS

In order to describe the manner in which the above-recited and other advantages and features of the invention can be obtained, a more particular description of the invention briefly described above will be rendered by reference to specific embodiments and/or implementations thereof which are illustrated in the appended drawings. Understanding that these drawings depict only typical embodiments and/or implementations of the invention and are not therefore to be considered to be limiting of its scope, the invention will be described and explained with additional specificity and detail through the use of the accompanying drawings in which.

DETAILED DESCRIPTION

Figure 1:
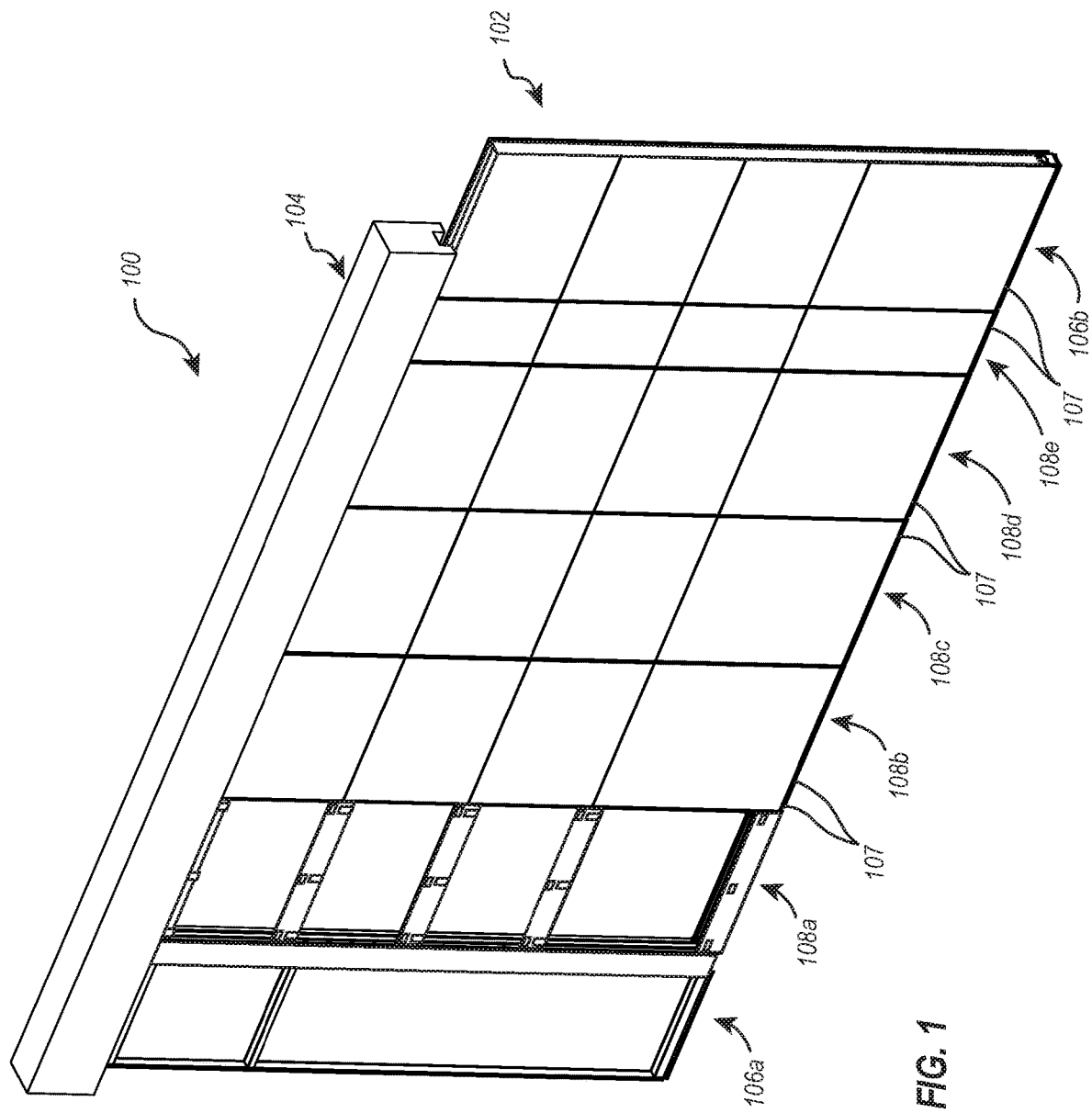
FIG. 1 illustrates perspective view of a foldable modular wall system in accordance with an implementation of the present disclosure, with the system in a closed configuration.

Implementations of the present disclosure comprise systems, methods, and apparatus for modular wall construction and design. More specifically, implementations of the present disclosure relate to modular wall systems and components thereof that enable wall modules to be folded or unfolded relative to one another to undivide or divide a space.

FIGS. 1-4 illustrates a foldable modular wall system 100 according to one implementation of the present disclosure. The illustrated wall system 100 includes a modular wall 102 and a track system 104. In the illustrated embodiment, the modular wall 102 includes a stationary wall module 106 (i.e., stationary wall modules 106a, 106b) at opposing ends thereof. The modular wall 102 also includes a plurality of movable or foldable wall modules 108 (e.g., 108a, 108b, 108c, 108d, 108e).

It will be appreciated that modular wall systems according to the present disclosure may include any number of movable or foldable wall modules 108. For instance, the overall length of the modular wall and/or the width of the various wall modules may necessitate including fewer or more movable or foldable wall modules in a particular circumstance. It will also be appreciated that foldable modular wall systems of the present disclosure may also not require the inclusion of one or both of the stationary wall modules 106. Rather, for instance, a foldable modular wall system may only include movable or foldable wall modules and not stationary wall modules. In some embodiments, the foldable modular wall system (e.g., with or without the stationary wall modules) can be free standing (e.g., not anchored or connected to a permanent wall structure). In still other embodiments, the one or both of the stationary wall modules 106 may be eliminated and the modular wall system may be connected to a permanent wall structure.

In some embodiments, one or more of the movable or foldable wall modules 108 may be replaced with or incorporate a doorway. For instance, wall module 108c may include a doorway or other opening that allows access from one side of modular wall 102 to the other. In some cases, a door may be mounted in the doorway or opening to allow for the doorway to be selectively opened or closed. Similarly, one of the movable or foldable wall modules 108 may include a window, display unit (e.g., shelf, shadow box, etc.) or the like.

The modular wall 102 may also incorporate various technologies that are unrelated to the foldable nature of the modular wall 102. For instance, electrical cables, plumbing, HVAC, displays (e.g., TV screens, computer monitors, etc.) may be incorporated into or mounted on the modular wall 102.

As alluded to above, one or both of the stationary wall modules 106 may be secured in place such that they do not move when the modular wall system 100 is installed in a building. For instance, the stationary wall modules 106 may be (but are not required to be) secured to permanent structures of the building, such as walls, ceilings, or floors. In contrast, the movable or foldable wall modules 108 can move relative to the stationary wall modules 106, the track system 104, and one another so as to either divide a larger space into two or more smaller spaces or undivide two more smaller spaces into a single larger space.

Figure 2:
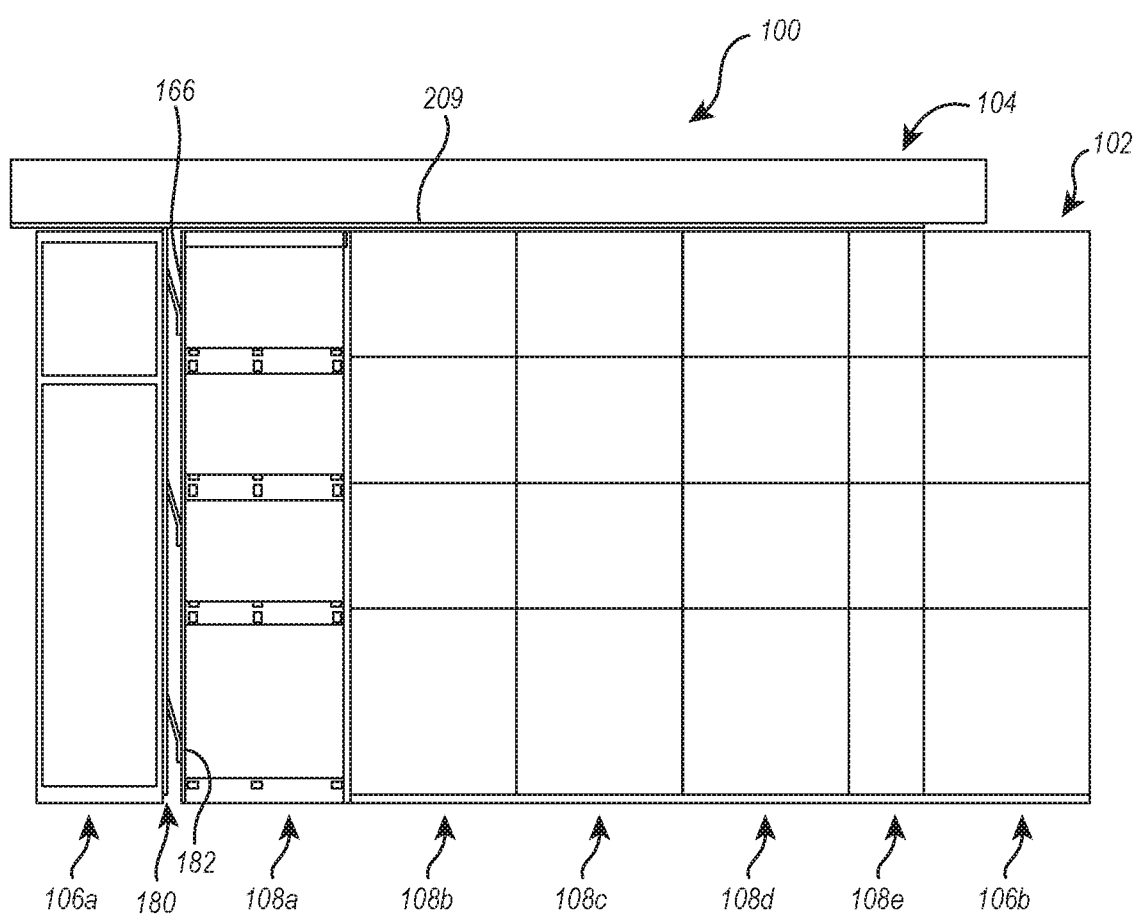
FIG. 2 illustrates a side elevational view of the foldable modular wall system of FIG. 1.
Figure 3:
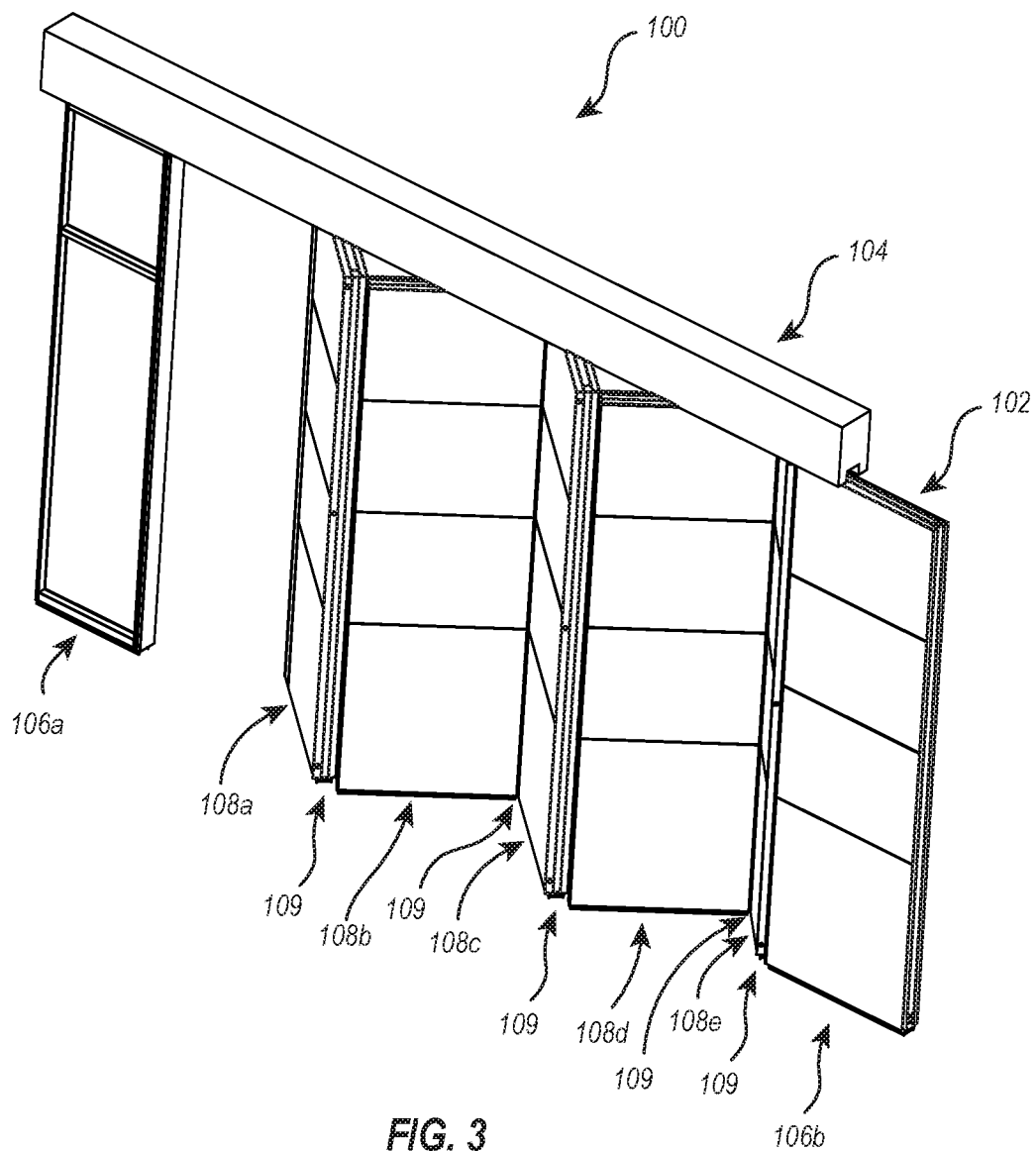
FIG. 3 illustrates a perspective view of the foldable modular wall system of FIG. 1 in a partially open configuration.
Figure 4:
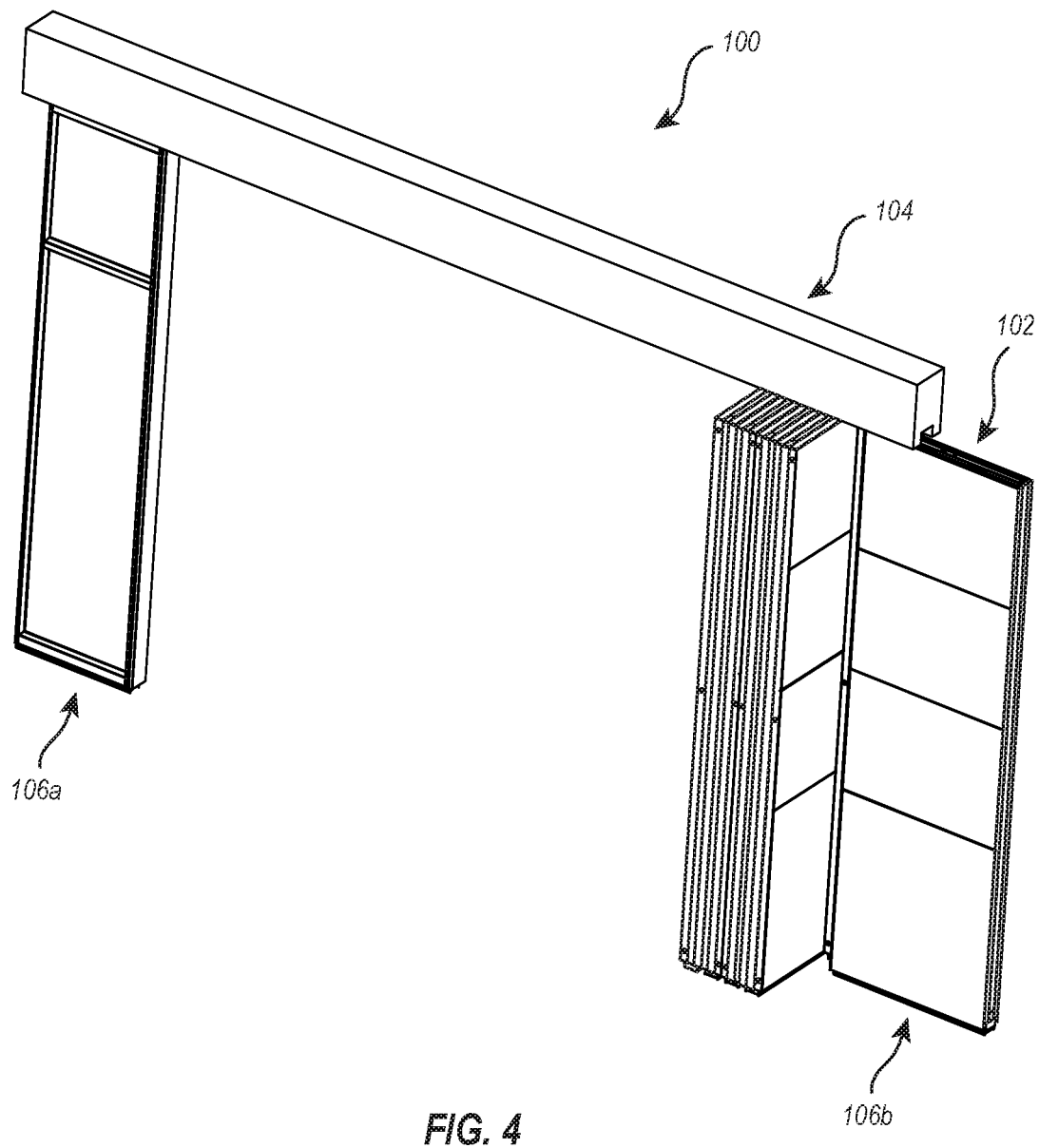
FIG. 4 illustrates a perspective view of the foldable modular wall system of FIG. 1 in an open or storage configuration.

For instance, FIGS. 1 and 2 shows the foldable wall modules 108 in an unfolded configuration such that the foldable wall modules 108 form a wall that divides a larger space into at least two smaller spaces. In contrast, FIG. 3 illustrates the movable or foldable wall modules 108 partially folded relative to one another. FIG. 4 shows the movable or foldable wall modules 108 completely folded relative to one another (e.g., adjacent wall modules 108 are folded 180° relative to one another) such that the movable or foldable wall modules 108 are in an open or storage configuration. When the movable or foldable wall modules 108 are in the storage configuration, the wall module 102 does not divide a larger space into smaller spaces. Rather, the wall module 102 is a least partially disposed out of the way such that there is free flow between the two sides or the spaces on opposing sides of the wall module 102.

As will be discussed in greater detail below, the movable or foldable wall modules 108 are hingedly connected to one another to enable the movable foldable wall modules 108 to fold relative to one another. As can be seen in FIG. 3, the movable or foldable wall modules 108 can be connected by hinges 109 such that the hinges 109 open in alternating directions. As a result, the movable are foldable wall modules 108 can be folded or collapsed into the storage position shown in FIG. 4.

As will also be discussed in greater detail below, the movable or foldable wall modules 108 are also slidably and pivotally connected to the track system 104. Pivotally connecting the movable or foldable wall modules 108 to the track system 104 allows the movable or foldable wall modules 108 to pivot or rotate relative to the track system 104, thereby enabling the movable or foldable wall modules 108 to move between the various positions shown in FIGS. 1-4. Slidably connecting the movable or foldable wall modules 108 to the track system 104 also enables the movable or foldable wall modules 108 to move between the various positions shown in FIGS. 1-4.

Although not illustrated, the wall system 100 may include a closet or other enclosure in which the movable or foldable wall modules 108 may be stored when the modular wall 102 is in the storage configuration (FIG. 4). For instance, the wall system 100 may include a closet or other enclosure adjacent to stationary wall module 106b. When the modular wall 102 is moved to the storage configuration, the movable or foldable wall modules 108 may be positioned within the closet or enclosure. The closet or enclosure may include one or more doors to enclose the wall modules 108 and remove them from sight.

According to the embodiment illustrated in FIGS. 1-4, each of the wall modules 106, 108 includes opposing vertical support members and horizontal support members extending therebetween. The movable or foldable wall modules 108 are connected together at adjacent vertical support members. For instance, a left vertical support member of one wall module 108 is connected to a right vertical support member of an adjacent wall module 108. As noted, such connection can be made by way of a hinge 109 that allows the adjacent wall modules 108 to fold or unfold relative to one another. Similarly, wall module 108e can be connected to wall module 106b via a hinge 109 to allow wall module 108e to fold or unfold relative to wall module 106b.

In the illustrated embodiment, all of movable or foldable wall modules 108 have substantially the same dimensions except for wall module 108e. In particular, each of wall modules 108a-108d has a height and a width that are substantially equal to the heights and widths of one another. In contrast, wall module 108e has a width that is approximately have the width of the other wall modules 108. As can be seen in FIG. 4, the smaller width of wall module 108e allows wall module 108e to fold relative to wall module 106b and the other wall modules 108 without extending beyond the other wall modules 108.

As also shown in FIGS. 1-4, each of the wall modules 106, 108 may also include one or more exterior wall elements 107. Such exterior wall elements 107 may cover or conceal from view the vertical support members and/or horizontal supports. The exterior wall elements 107 may also acts as a visual and/or sound barrier between two spaces divided or defined by modular wall 102. Each wall module may include a single exterior wall element 107 on one surface thereof as in the case of wall modules 106, 108c-108e, or a single exterior wall element on opposing sides thereof. Alternatively, the wall modules may include multiple exterior wall elements 107 on one or more sides thereof as in the case of wall module 108b.

It will be noted that wall module 108a is illustrated as not having any exterior wall elements 107 attached thereto. Such is the case simply to show the vertical support members and horizontal supports that form the frame of wall module 108a. The other wall modules can include similar or identical frames to that shown for wall module 108a.

In certain implementations, the exterior wall elements 107 may include an aesthetic display or appearance. For example, the exterior wall elements 107 may include an outer surface that provides structural and/or aesthetic appeal suitable for a residential, commercial, industrial, governmental, educational, and/or other building or environment. Furthermore, the outer surface of the exterior wall elements 107 may function as an outer or exterior surface of a wall, divide, barrier, or other architectural and/or decorative structural element.

Figure 13:
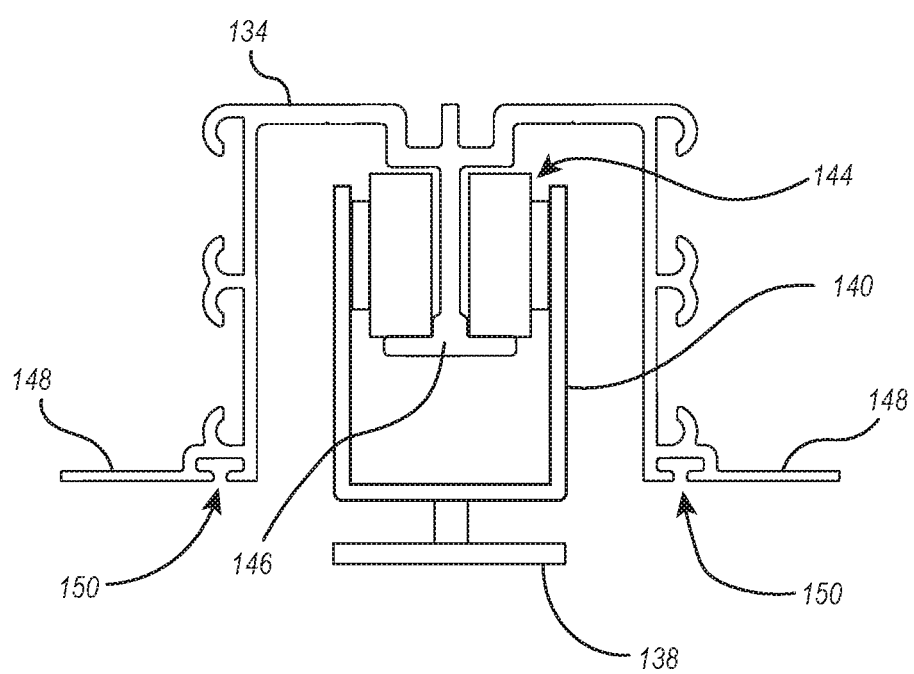

As can be best seen in FIG. 2, a gasket 209 may be connected to the lower end of the track system 104. The gasket 209 may extend between the track system 104 and the upper ends of the wall modules 106 and/or 108. The gasket 209 can enclose a gap between the track system 104 and wall modules 106 and/or 108. Enclosing such a gap can provide for better aesthetics and limit the ingress of unwanted materials into the track system 104, particularly when the modular wall 102 is in the closed configuration. In some embodiments, the gasket 209 can be mounted or secured within a connection feature on the track system 104. Connection feature 150 discussed below in connection with FIG. 13 is one example of such a connection feature.

Figure 5:
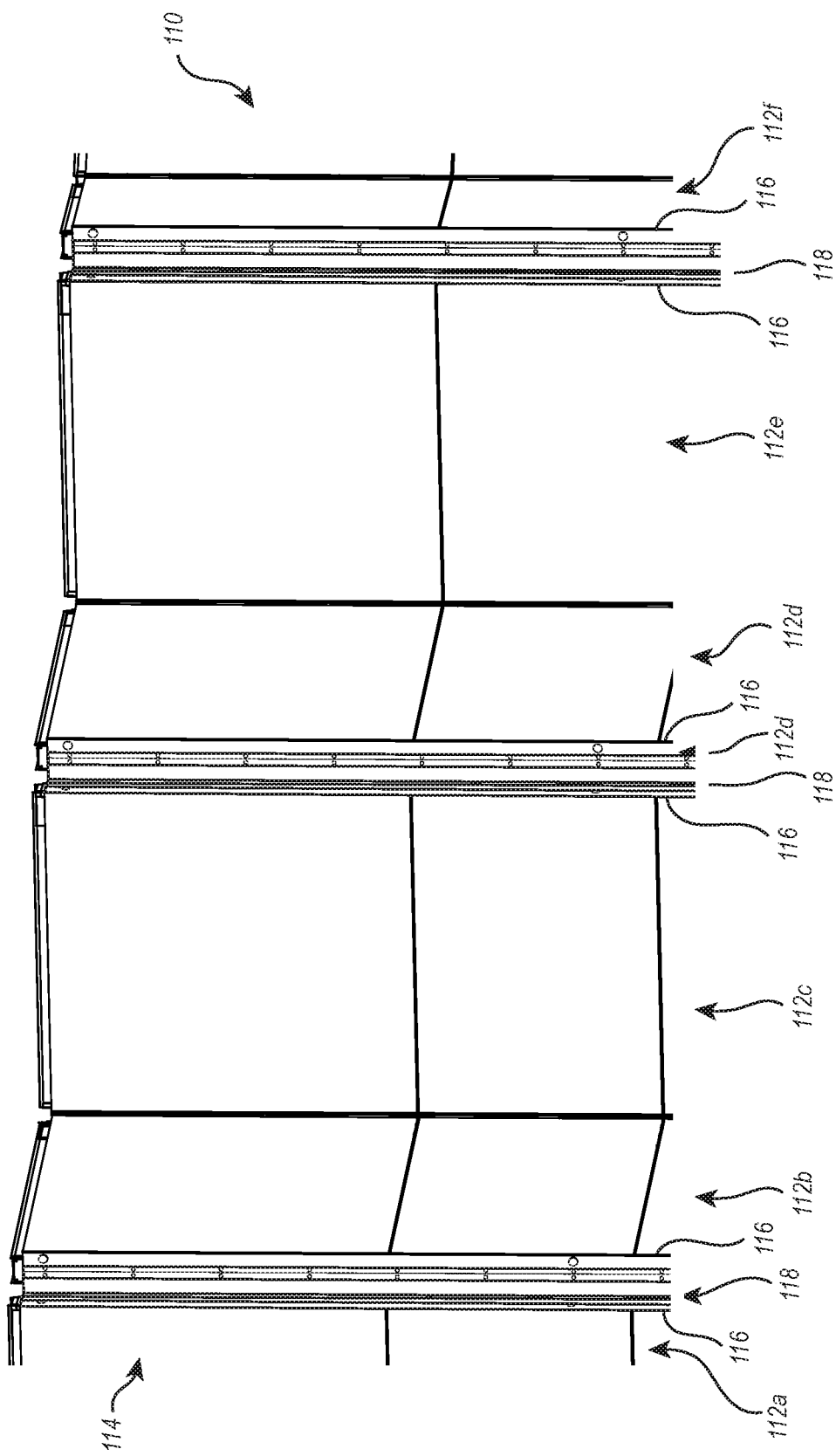
FIGS. 5 and 6 depict perspective views of a portion of another foldable modular wall system according to the present disclosure.
Figure 6:
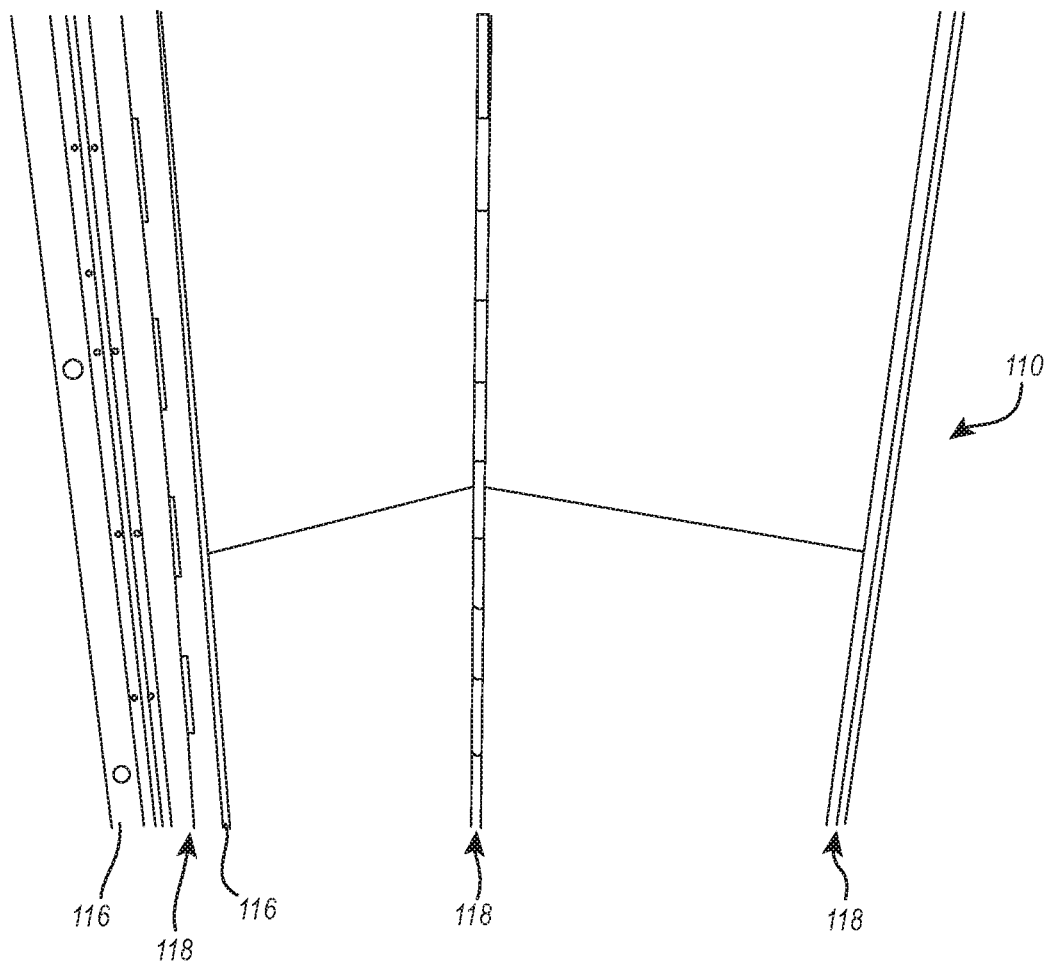

Attention is now directed to FIGS. 5-8, which are illustrations of portions of a modular wall system 110 that is similar or identical to system 100 in many respects. As can be seen in FIG. 5, system 110 includes a plurality of movable or foldable wall modules 112 (wall modules 112a-112f) that are connected to a track system 114. The wall modules 112 include vertical support members 116 that are used to provide structure to the wall modules 112 and to connect adjacent wall modules 112 together.

As can be seen in FIG. 5-8, the vertical support members 116 are connected together by hinges 118. In the example embodiment, the hinges 118 open in alternating directions between wall module connections. In other embodiments, the alternating pattern of the hinges 118 may vary. For instance, two subsequent hinges 118 may open in one direction and then two other subsequent hinges 118 may open in an opposite direction.

In some embodiments, when adjacent wall modules 112 are folded to be aligned with one another (similar to FIG. 1), the hinges 118 may be at least partially visible from at least one side of the modular wall and not visible from another side. For instance, the knuckle of the hinge 118 may be visible from one side of the modular wall while the hinge 118 is not visible from an opposing side of the modular wall.

Figure 7:
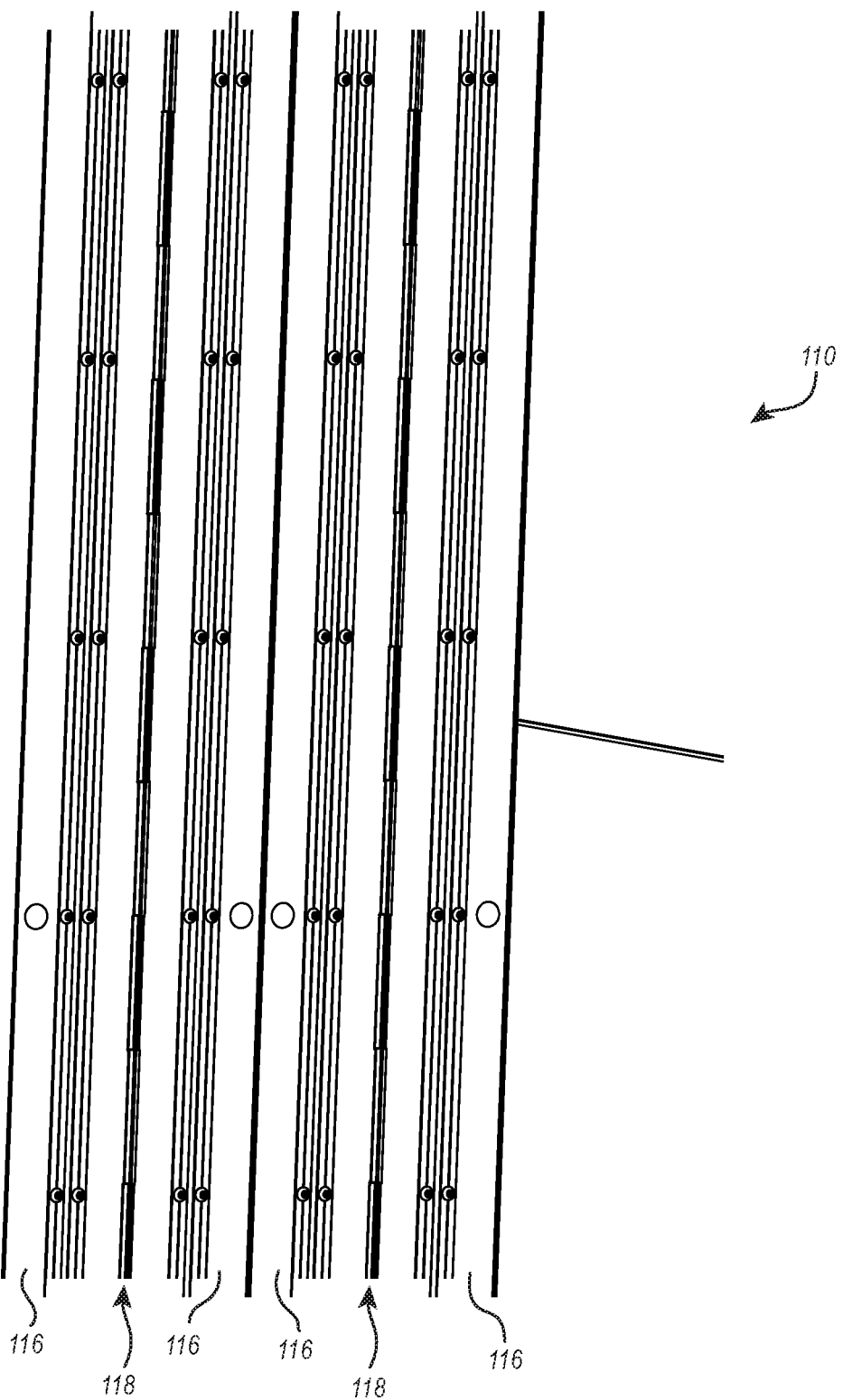
FIG. 7 depicts connections between wall modules of the foldable modular wall system of FIGS. 5 and 6.
Figure 8:
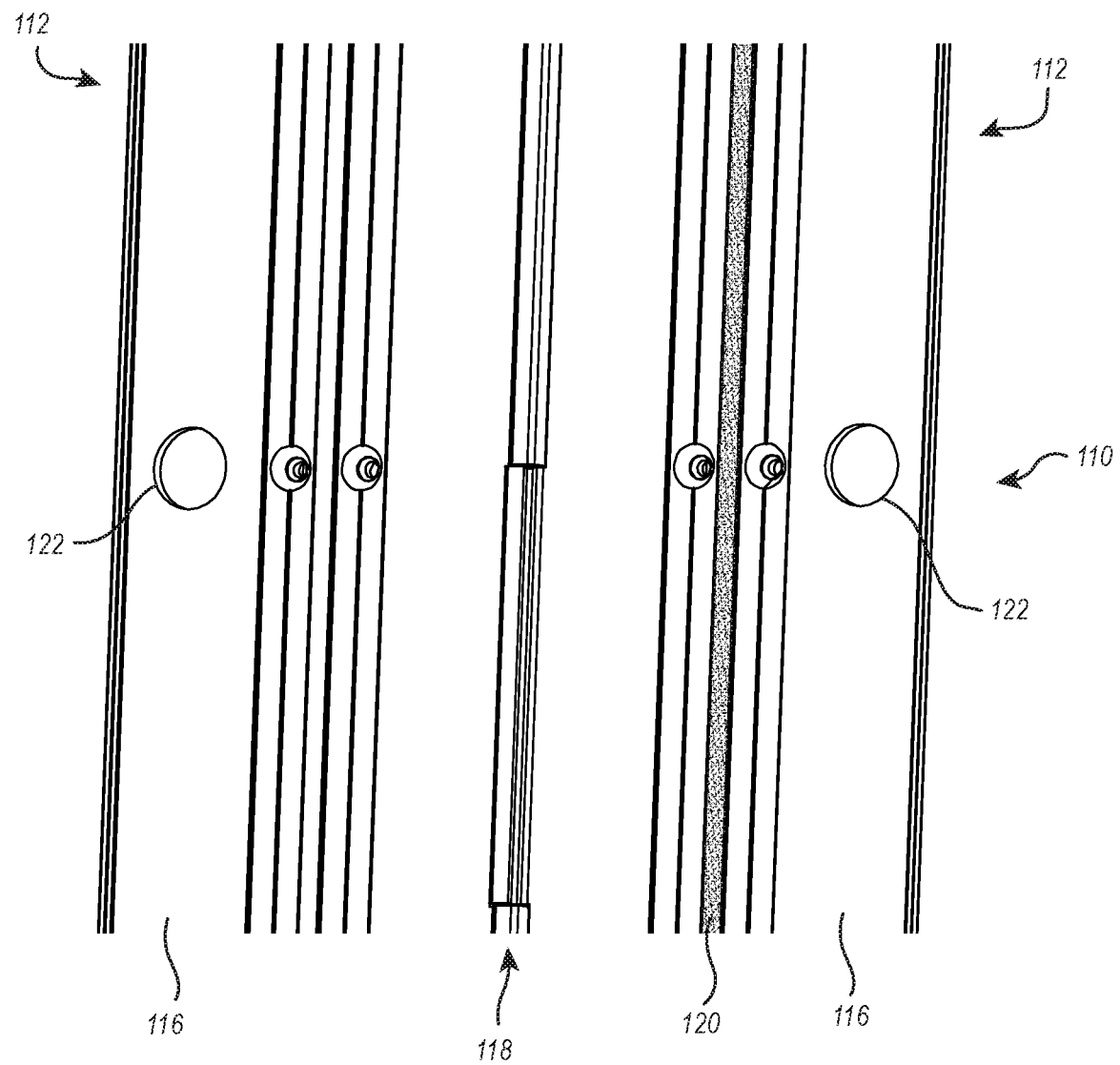
FIG. 8 depicts an attachment feature of the foldable modular wall system of FIGS. 5 and 6.

As best seen in FIGS. 7 and 8, vertical support members 116 and/or hinges 118 may include a noise dampening feature. For instance, a noise dampening element 120 (e.g., felt, cloth, foam, etc.) may be attached to one or both of the connected vertical support members 116 or sides of a hinge 118. The noise dampening element 120 may limit the noise made by the modular wall when the wall modules 112 are unfolded so that they are aligned with one another. For instance, when the hinges 118 close and/or the vertical support members 116 from adjacent wall modules 112 are moved towards one another, the noise dampening element 120 can prevent the elements (vertical support members 116, hinges 118) from loudly contacting one another. The noise dampening elements 120 can also inhibit sound from passing through the modular wall system 110 when the modular wall system 110 is in a closed configuration similar to that shown in FIG. 1 (e.g., the wall modules 112 are aligned with one another to form a wall or partition).

As can also be seen in FIG. 8, vertical support members 116 and/or hinges 118 may include one or more attachment features 122 that selectively secure the wall modules 112 in the closed configuration (see FIG. 1). In the illustrated embodiment, the attachment features 122 include magnets on connected vertical support members 116 or opposing halves of a hinge 118. When the wall modules 112 are in the closed or aligned configuration, the magnets on the connected vertical support members 116 attract one another, thereby holding the wall modules 112 in alignment with one another.

It will be appreciated that the attachment features 122 can include a single magnet and an opposing element (e.g., metal, etc.) that is attracted by the magnet. For instance, in some embodiments, one of the vertical support members 116 or a half of the hinge 118 may include a magnet while the other vertical support member 116 or other half of the hinge 118 is formed of or has attached thereto a material (e.g., iron) that is attracted to the magnet.

It will be appreciated that the attachment features 122 may include elements or structures other than magnets. For instance, the attachment features may include snaps, clips, hook and loop fasteners, friction fitting mating surfaces, and the like. Regardless of the specific form of the attachment features, the attachment features can be configured to selectively maintain the wall modules 112 in alignment with one another. The attachment features can also be configured to releasably connect to one another so that the wall modules 112 can be selectively moved from the closed configuration to the storage configuration (see FIG. 4).

Figure 9:
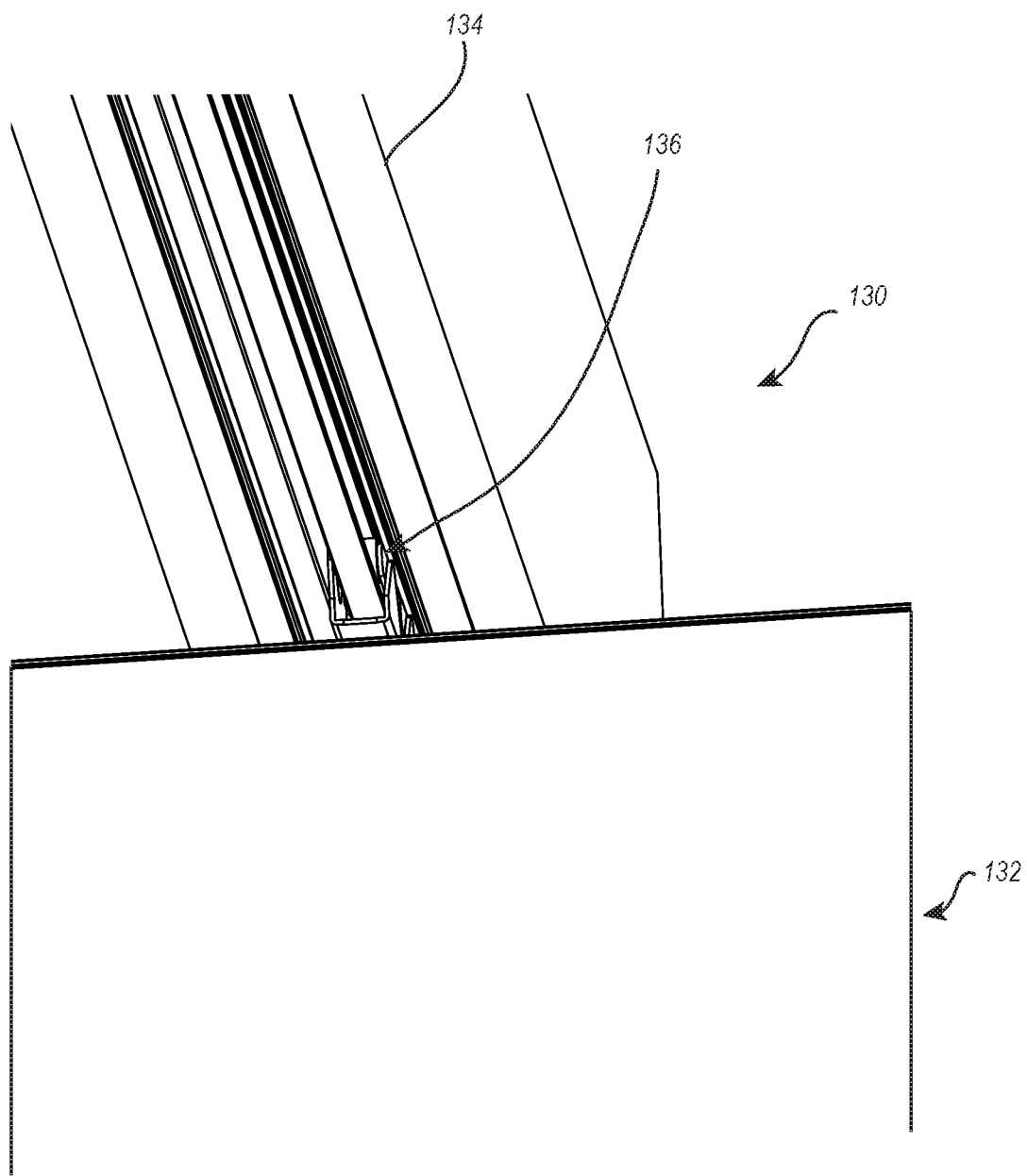
FIGS. 9-13 depict a track and roller assembly for moving a foldable modular wall between closed and open/storage configurations.

Attention is now directed to FIGS. 9-13, which illustrate an example track system 130 that is configured to enable movable or foldable wall modules to pivot and slide between the closed (FIG. 1) and storage (FIG. 4) configurations. FIG. 9 depicts a movable or foldable wall module 132 connected to a track 134 via a roller assembly 136. In FIG. 9, the wall module 132 is pivoted or rotated substantially perpendicular relative to the track 134 and roller assembly 136. Such relative positioning of wall module 132 relative to track 134 and roller assembly 136 is the condition generally found when wall module 132 is in the storage configuration.

Figure 10:
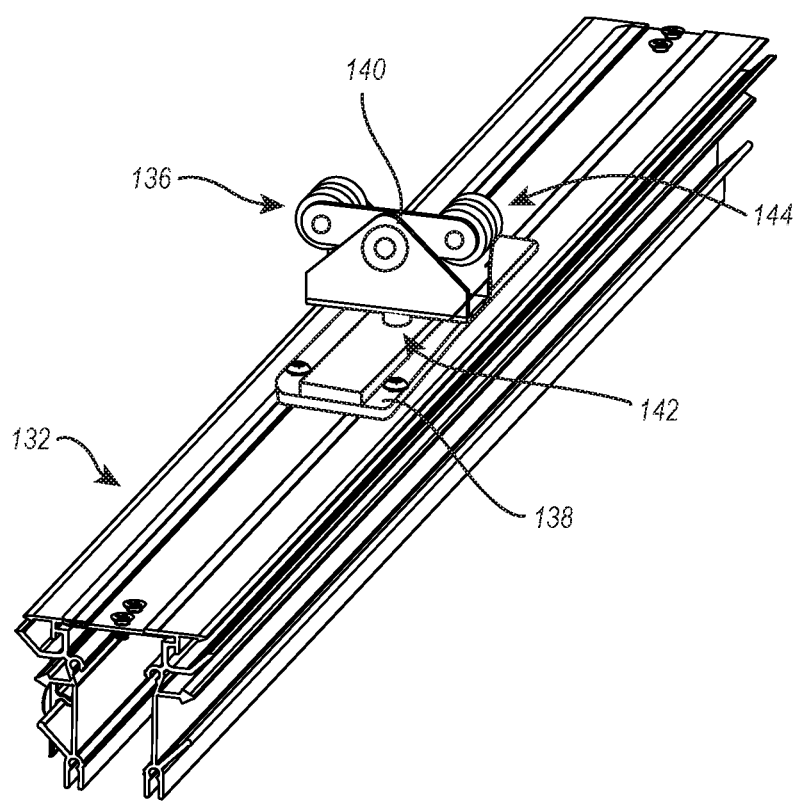

FIG. 10 illustrates a perspective view of the wall module 132 and roller assembly 136 without the exterior wall element or the track 134. The wall module 132 is rotated relative to the roller assembly 136 to a position similar to that of FIG. 9. As can be seen, when the wall module 132 is so rotated, the roller assembly 136 is arranged to roll in directions that are generally perpendicular to (the faces of) wall module 132.

Figure 11:
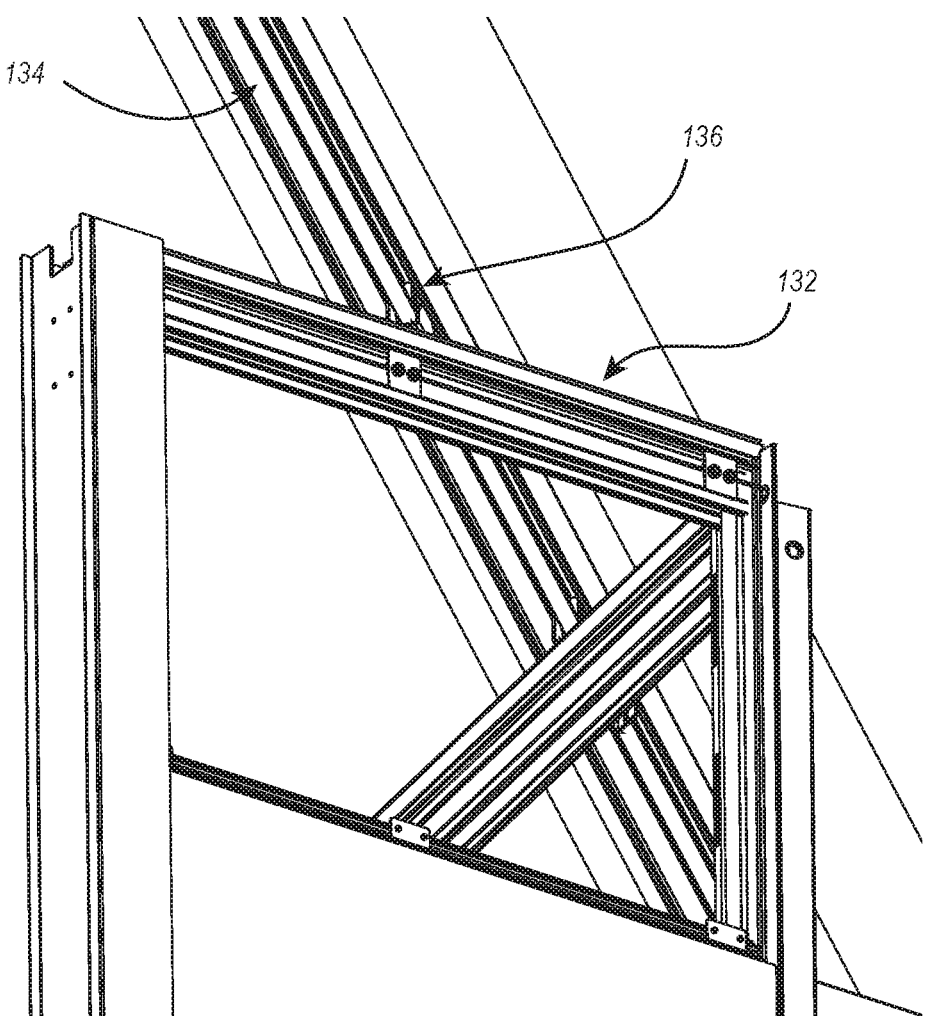

As shown in FIG. 11, wall module 132 (shown without the exterior wall elements) can rotate relative to roller assembly 136 and track 134 to a partially opened or angled configurations. In such configurations, the faces of wall module 132 are oriented at non-parallel and non-perpendicular angles relative to track 134 and the directions that roller assembly 136 moves.

Figure 12:
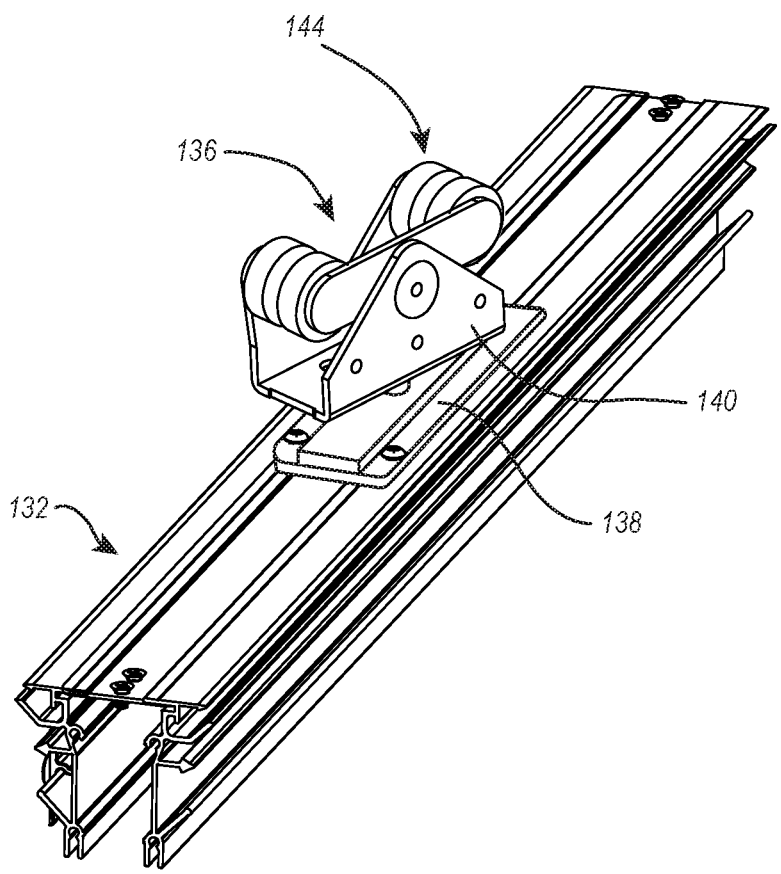

Continued rotation of wall module 132 relative to track 134 and roller assembly 136 can align wall module 132 with track 134 and roller assembly 136. For instance, as shown in FIG. 12, wall module 132 can be rotated so that wall module 132 is aligned with roller assembly 136. This is the condition that wall module 132 is in when modular wall 110 is in the closed configuration. In this configuration, (the faces of) wall module 132 are oriented generally parallel to the directions that roller assembly 136 moves.

As can be seen in FIGS. 10, 12, and 13, roller assembly 136 includes a stationary bracket 138 that is connected to wall module 132 in a fixed manner Roller assembly 136 also include a pivoting roller bracket 140. Roller bracket 140 is pivotally connected to stationary bracket 138 by a pivot 142. The pivot 142 enables wall module 132 to pivot or rotate relative to roller bracket 140 so that wall module 132 can pivot between the opened/storage and closed configurations.

Connected to roller bracket 140 are a plurality of rollers 144 that engage track 134 as best shown in FIG. 13. As can be seen, track 134 includes a hanger 146 in which rollers 144 can ride. In the illustrated embodiment, the hanger 146 includes opposing sides and rollers 144 are disposed in both sides. Such arrangement can facilitate smooth rolling of rollers 144 along track 134 and can provide stability to wall module 132. In other embodiments, however, hanger 146 may only receive rollers 144 in a single side. Additionally, roller assembly 136 may only include a single roller 144.

Track 134 can provide additional functionality. For instance, track 134 can include connection features 148, 150. Connection features 148 include flanges extending from the lower ends of opposing sides of track 134. Connection features 150 include generally T-shaped channels that open towards the lower end of track 134. Connection features 148, 150 can enable other elements to be connected to track 134. For instance, ceiling tiles or structures can be connected to or rest upon connection features 148. Similarly, ceiling tiles or structures can be connected to or suspended from connection features 150.

Figure 14:
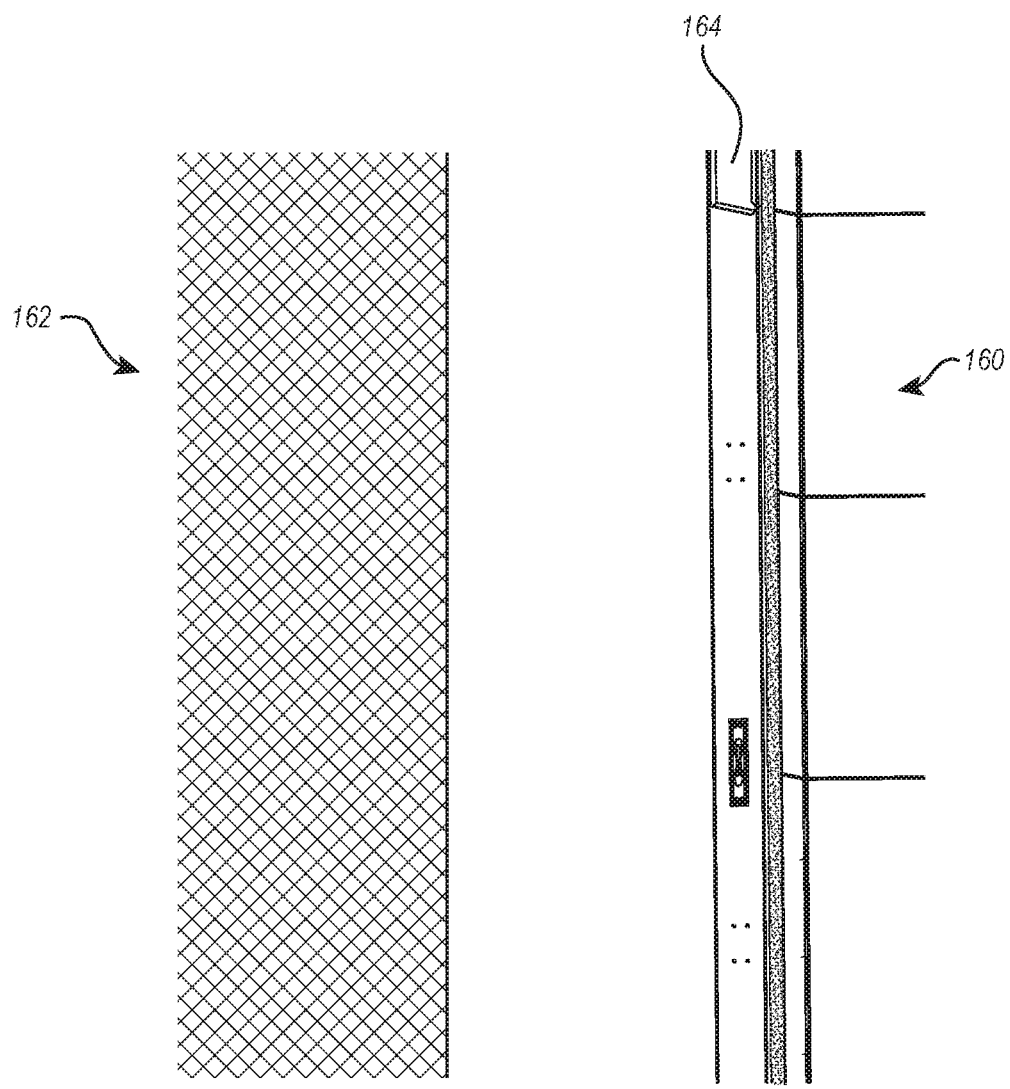
FIGS. 14-17 depict an extendable endcap of a wall module.
Figure 15:
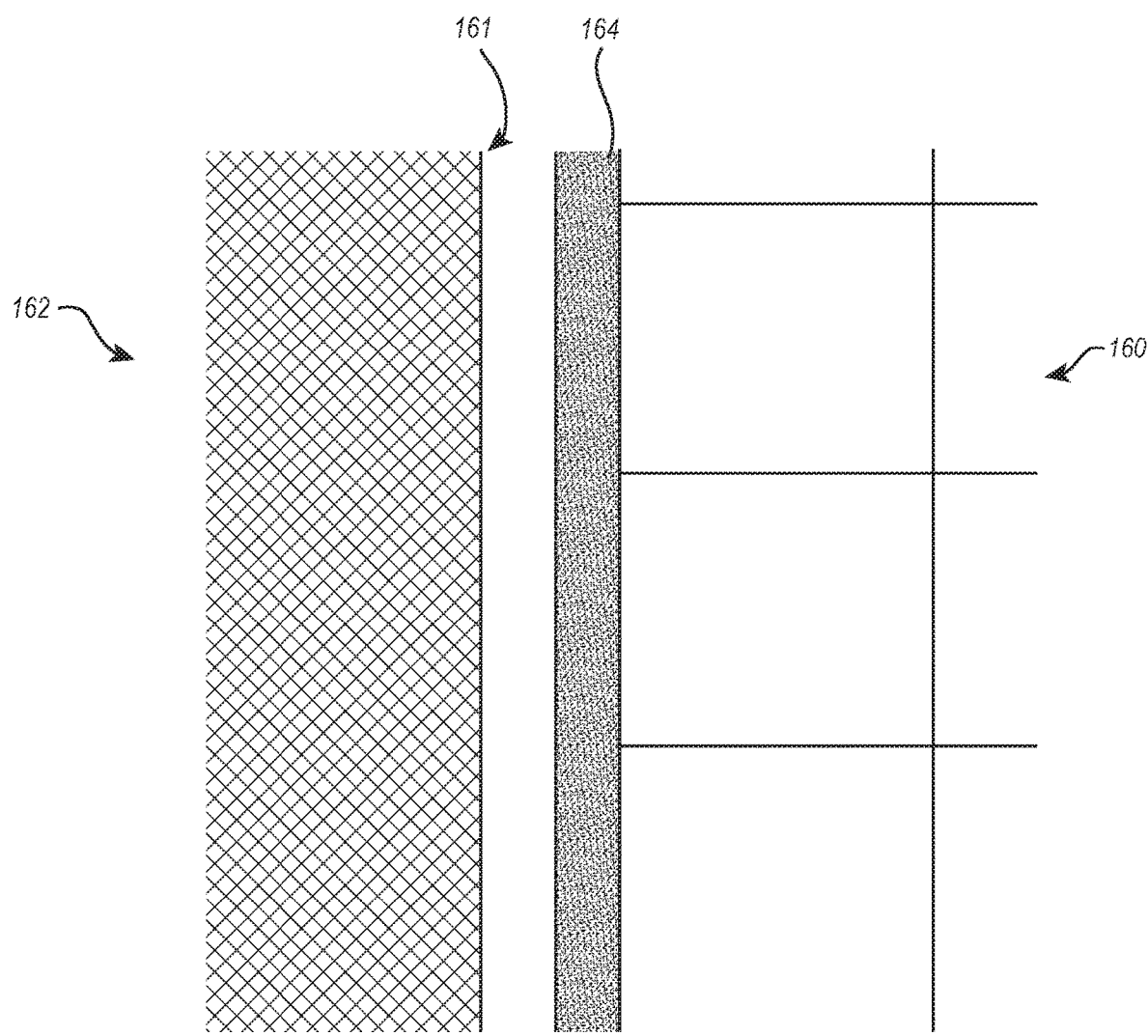
Figure 16:
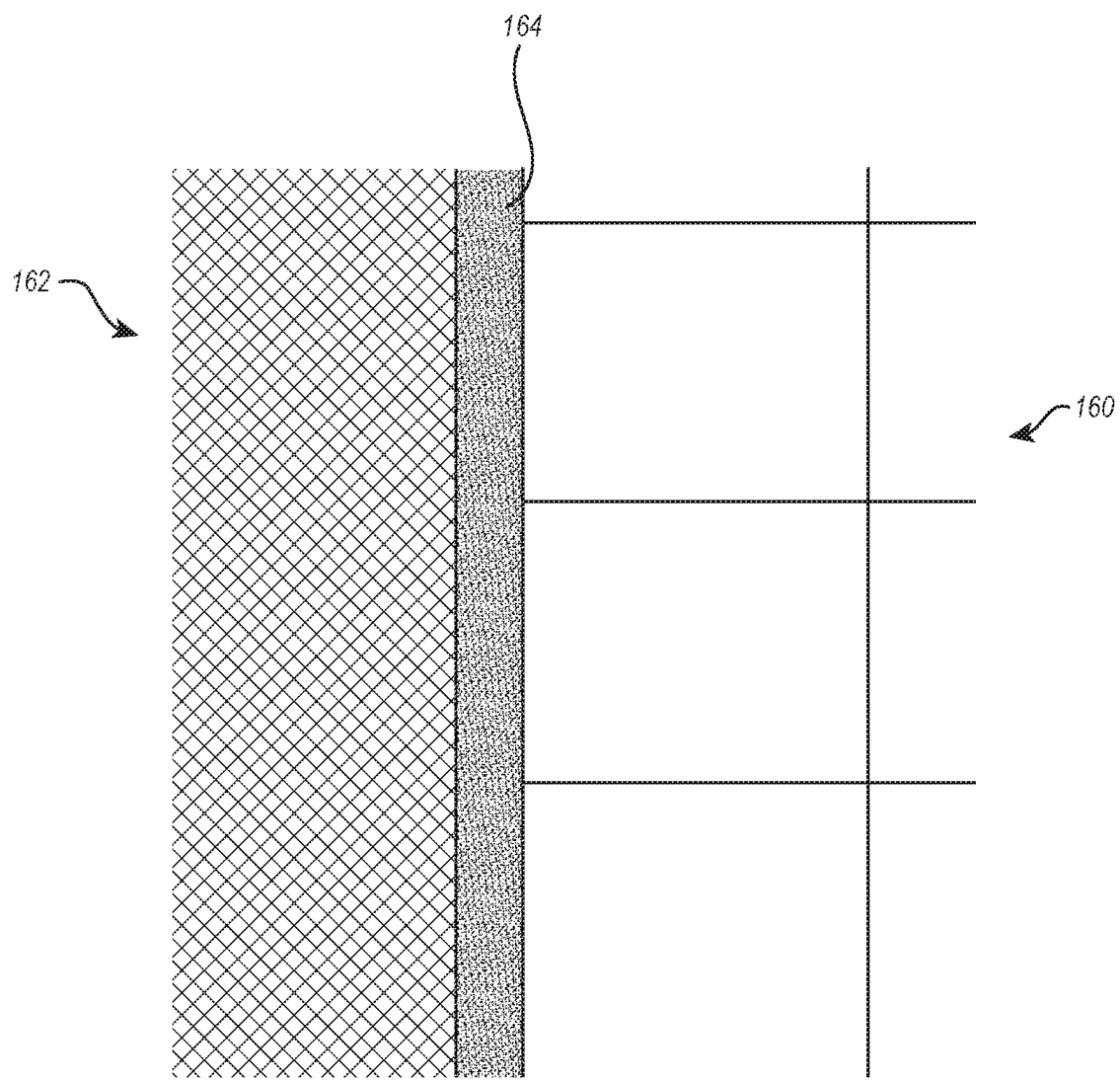

Attention is now directed to FIGS. 14-17, which illustrate an extension feature of one wall module. In particular, FIGS. 14 and 15 illustrate a wall module 160 being moved from an open or partially opened configuration towards a closed configuration. As can be seen in FIG. 15, when wall module 160 is rotated to the closed configuration, a space or gap 161 may still exist between the end of wall module 160 and stationary wall module 162. To close the space or gap 161, wall module 160 includes a selectively extendable end cap 164 disposed at a free end of an end module, such as module 108a shown in FIG. 2. When comparing FIGS. 15 and 16, it will be evident that end cap 164 has been extended relative to the rest of wall module 160 and into engagement with wall module 162. As a result, the previously existing space or gap 161 is closed.

Figure 17:
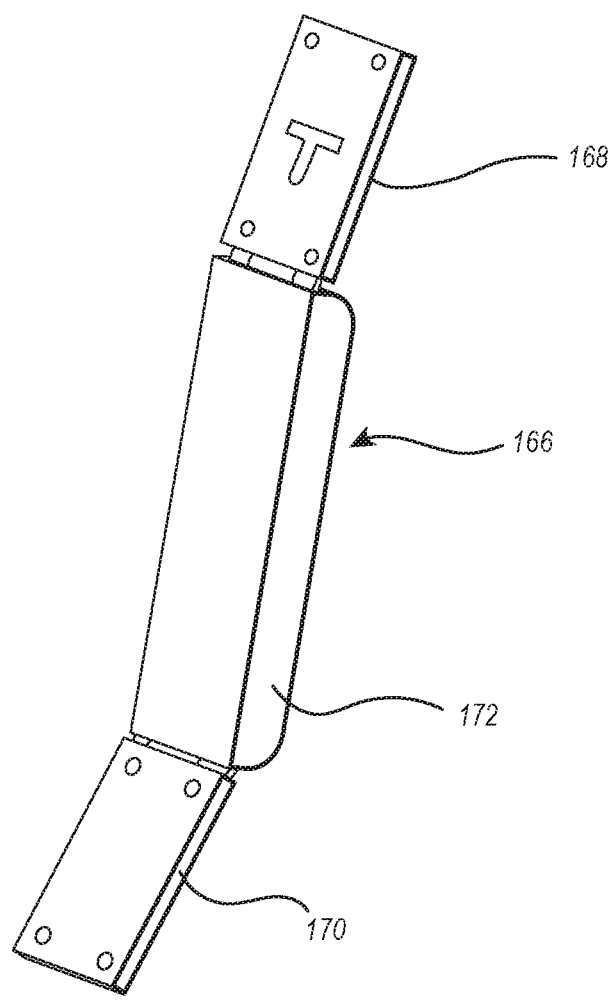

FIG. 17 illustrates an example extension bracket 166 that enables end cap 164 to selectively extend from the rest of wall module 160. The extension bracket 166 include a first connection bracket 168 at a first end, a second connection bracket 170 at a second end thereof, and a hinge connector 172 connected between the first and second connection brackets 168, 170. Opposing ends of the hinge connector 172 are hingedly connected to the first and second connection brackets 168, 170 such that the hinge connector 172 can pivot relative to the first and second connection brackets 168, 170. In addition to the pivotal or rotational connection between the hinge connector 172 and the first and second connection brackets 168, 170, such connections can also allow for some linear movement therebetween. In the illustrated embodiment, first connection bracket 168 is connectable to end cap 164 and second connection bracket 170 is connectable to a vertical support member of wall module 160.

Returning attention back to FIG. 2, wall module 108a includes an extendable end cap 180 connected to a vertical support member 182 by way of multiple extension brackets 166. The extension brackets 166 allow end cap 180 to move closer to or further away from vertical support member 182. Movement of end cap 180 closer to vertical support member 182 can disengage wall module 108a from wall module 106a, thereby creating a space or gap therebetween. Thereafter, wall module 108a can be rotated and moved towards the storage position. Conversely, when wall module 108a is moved from the storage position to the closed position, a space or gap may exist between wall modules 108a, 106a. End cap 180 can then be extended into contact with wall module 106a to close the space or gap.

Figure 18:
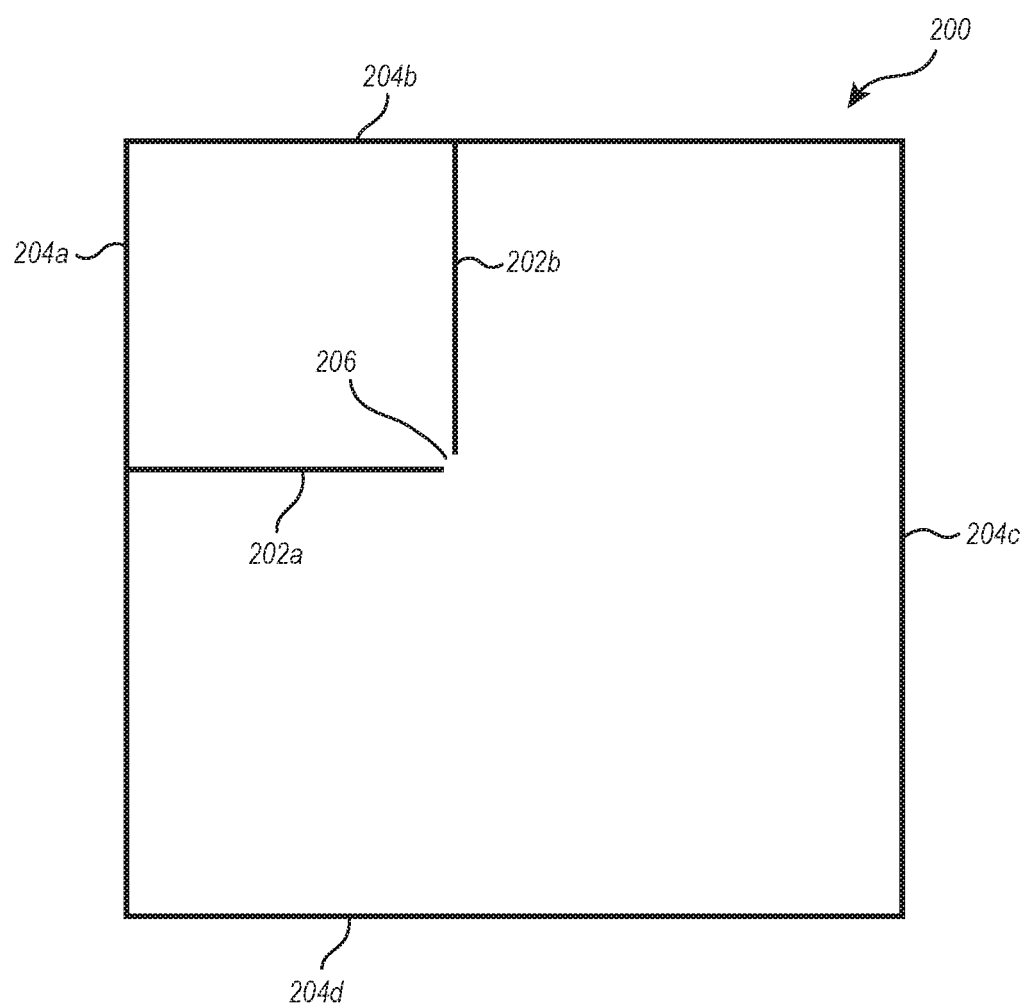
FIG. 18 depicts a wall system that includes permanent walls and multiple foldable modular wall systems.

Attention is now directed to FIG. 18, which illustrates, in schematic form, a wall system 200 that includes multiple foldable modular wall systems 202 (e.g., 202a, 202b). The depicted wall system 200 also includes multiple non-folding (e.g., permanent, fixed, modular) walls 204 (e.g., 204a, 204b, 204c, 204d). As illustrated, an installer can position one end of the foldable modular wall system 202a adjacent to the non-folding wall 204a and one end of the foldable modular wall system 202b adjacent to the non-folding wall 204b. In some embodiments, the installer connects the foldable modular wall systems 202a, 202b to the non-folding walls 204a, 204b.

As can also be seen in FIG. 18, the foldable modular wall systems 202a, 202b extend towards one another such that the second ends of the foldable modular wall systems 202a, 202b meet at a corner 206. During installation, an installer can connect the second ends of the foldable modular wall systems 202a, 202b together at the corner 206. In other embodiments, the second ends of the foldable modular wall systems 202a, 202b can abut one another and/or connect to one another when the foldable modular wall systems 202a, 202b are moved to the closed configurations.

While FIG. 18 illustrates the foldable modular wall systems 202a, 202b forming a corner 206 at about a 90° angle, a designer or installer can configure or arrange the foldable modular wall systems 202a, 202b to meat at any desired angle. Furthermore, more than two foldable modular wall systems 202 can meet to form one or more angles (e.g., such as when multiple rooms are formed with foldable modular wall systems 202).

It will be appreciated that modular wall systems according to the present disclosure may include any number of movable or foldable wall modules 108. For instance, the overall length of the modular wall and/or the width of the various wall modules may necessitate including fewer or more movable or foldable wall modules in a particular circumstance. It will also be appreciated that foldable modular wall systems of the present disclosure may also not require the inclusion of one or both of the stationary wall modules 106. Rather, for instance, a foldable modular wall system may only include movable or foldable wall modules and not stationary wall modules. In some embodiments, the foldable modular wall system (e.g., with or without the stationary wall modules) can be free standing (e.g., not anchored or connected to a permanent wall structure). In still other embodiments, the one or both of the stationary wall modules 108 may be eliminated and the modular wall system may be connected to a permanent wall structure.

It will be appreciated that an existing modular wall may be retrofitted to form a foldable modular wall system as described herein. For instance, hinges (e.g., 118) may be connected between adjacent wall modules of an existing modular wall and the wall modules may be connected to a track (e.g., 104) as described herein to form a foldable modular wall system. Likewise, the foldable modular wall systems described herein can be converted into a stationary modular wall system. For instance, the track 104 can be removed and the wall modules 106, 108 can be connected together with fixed connectors rather than hinges 104.

Figure 19:
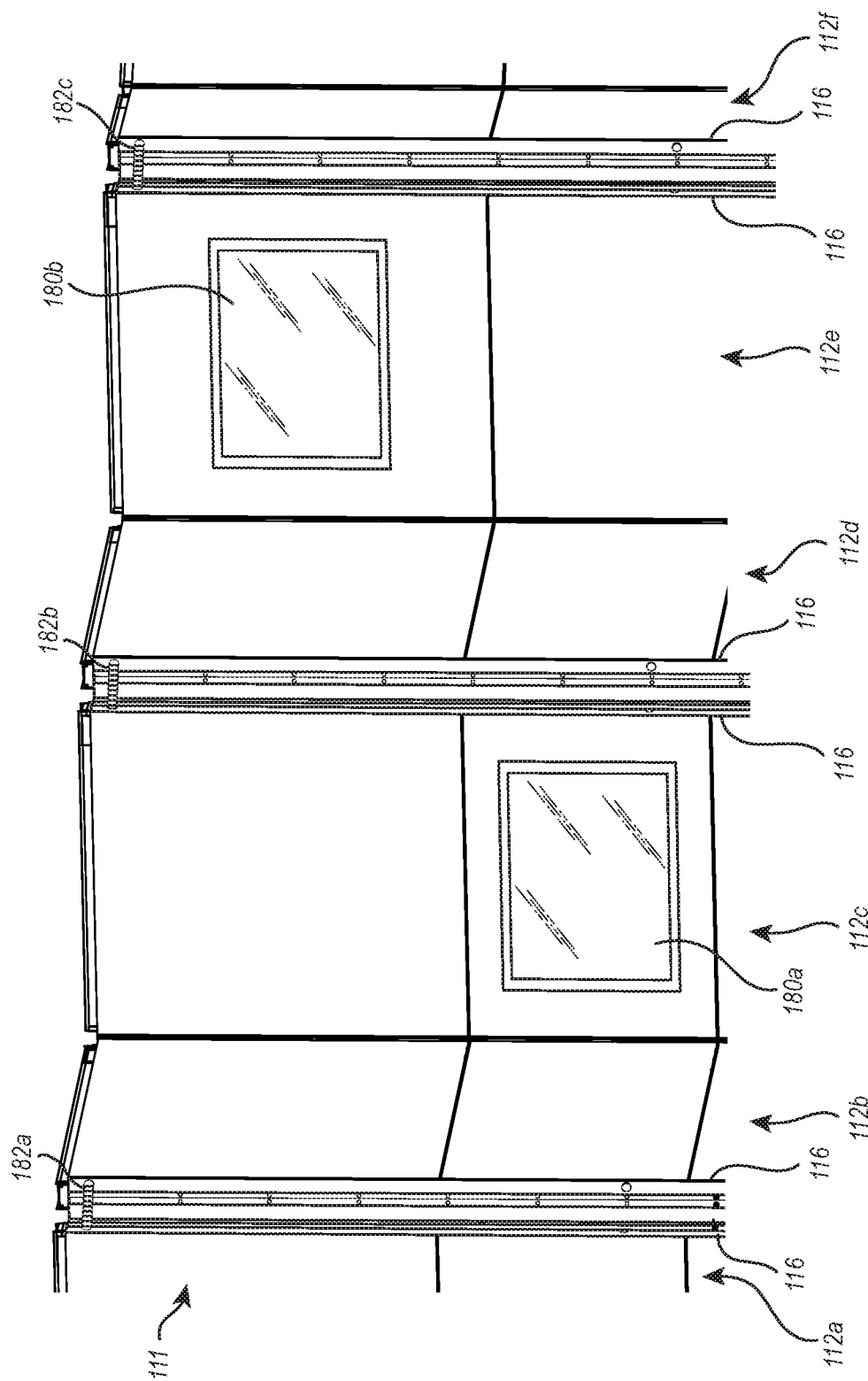
FIG. 19 depicts a wall system that includes various electrical components and power hinge jumpers.

In one implementation of a foldable modular wall system 111, as shown in FIG. 19, a plurality of power hinge jumpers 182a-182c can be included to carry electrical power between various foldable wall modules 112 to power various electrical components of the system 111. In particular, the foldable wall system 111 of FIG. 19 is similar to the foldable wall system 110 of FIG. 5, which includes a plurality of foldable wall modules 112 and respective vertical supports 116. The foldable wall system 111 illustrated in FIG. 19 is configured in a partially folded position. However, the embodiment of the system illustrated in FIG. 19 also includes one or more media screens 180a, 180b that are disposed on or embedded within various foldable wall modules 112. The media screens may require electrical power.

Figure 20:
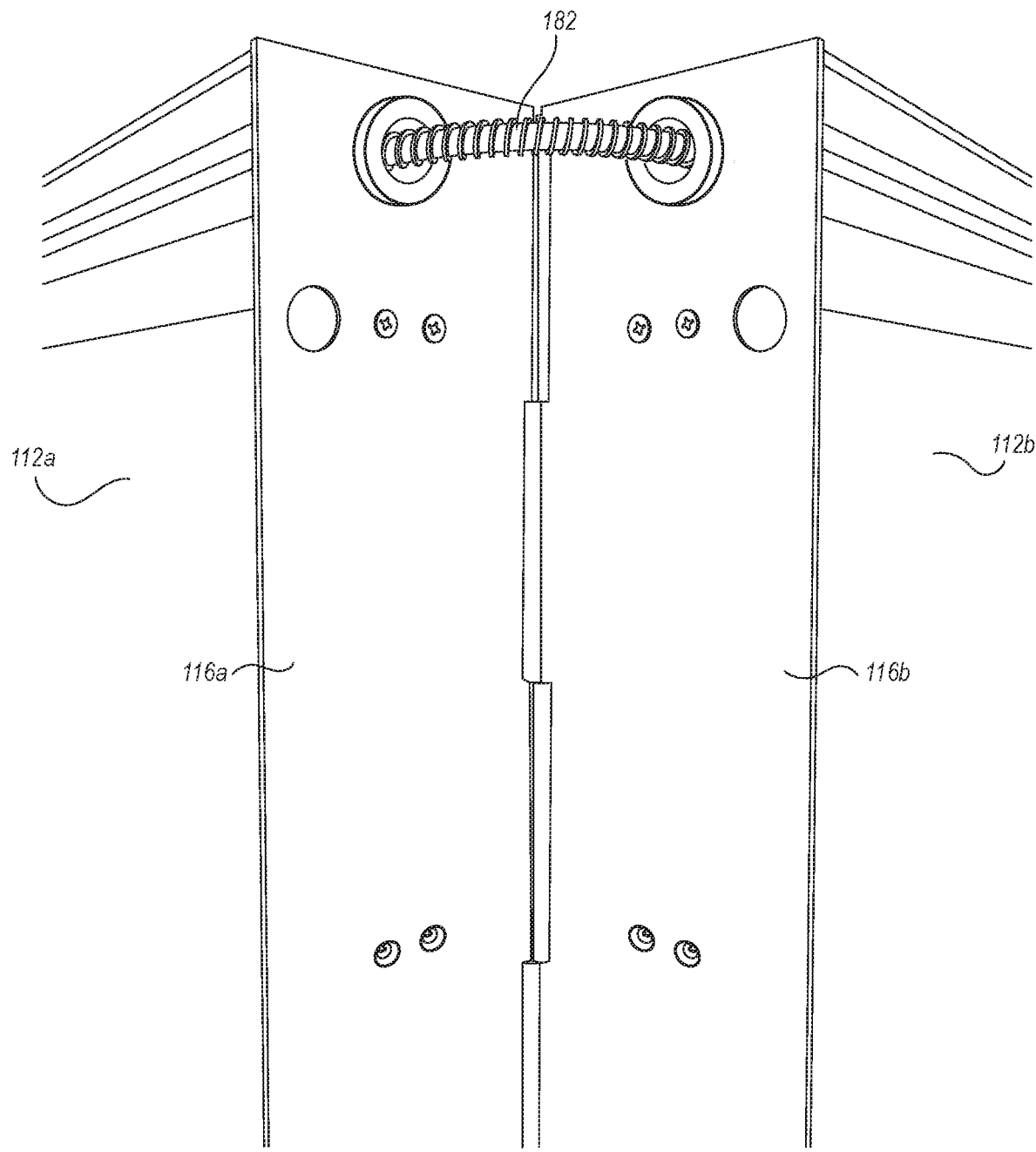
FIGS. 20-21 depict a power hinge jumper spanning two foldable wall modules in various open and closed positions.

Along these lines, the wall system 111 also includes one or more power hinge jumpers 182a-182c, as mentioned above. Each power hinge jumper 182 may be disposed between two adjacent vertical supports 116 and may be flexible to accommodate varying positions of the foldable wall modules 112 as the wall system 111 is opened and closed. For example, FIG. 20 illustrates a close-up view of a power hinge jumper 182 flexing between two adjacent vertical supports 116a, 116b of two adjacent foldable wall modules 112a, 112b. As FIG. 20 shows, the power hinge jumper 182 is able to flex and bend in reaction to various angels that are achieved between the modules 112a, 112b when the system 111 is opened and closed.

Figure 21:
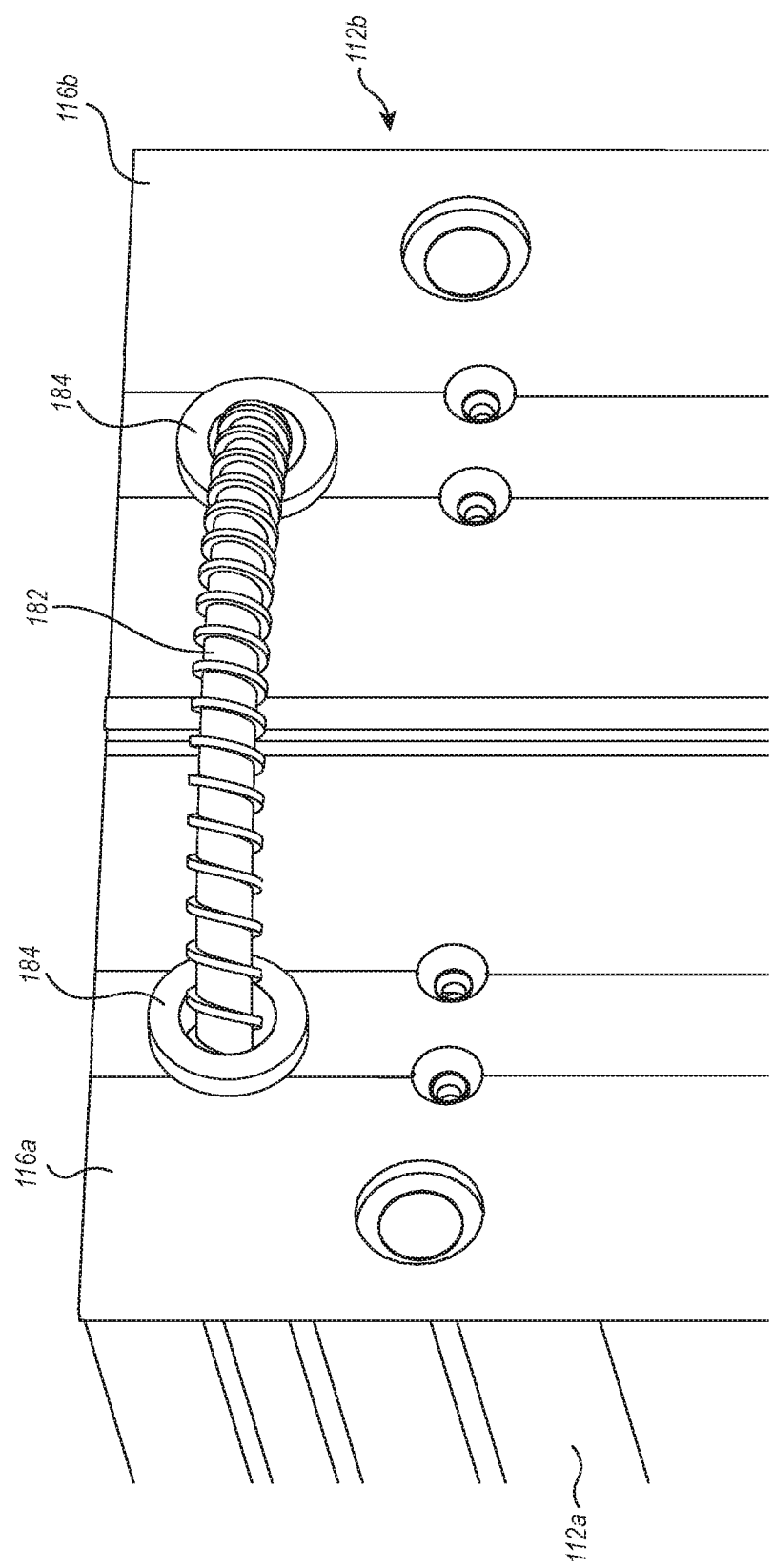

For further illustration, FIG. 21 shows a power hinge jumper 182 spanning two adjacent vertical supports 116a, 116b connected to two adjacent foldable wall modules 112a, 112b in a fully open position so that the vertical supports 116a, 116b are substantially coplanar. In this case, the power hinge jumper 182 flexes across 180-degrees between the two foldable wall modules 112a, 112b. Each vertical support 116a, 116b may have through-holes through which the power hinge jumper 182 may pass. In the illustrated embodiment, grommets 184 are positioned at the interface between the power hinge jumper 182 and the through-holes of the vertical supports 116a, 116b.

Figure 22:
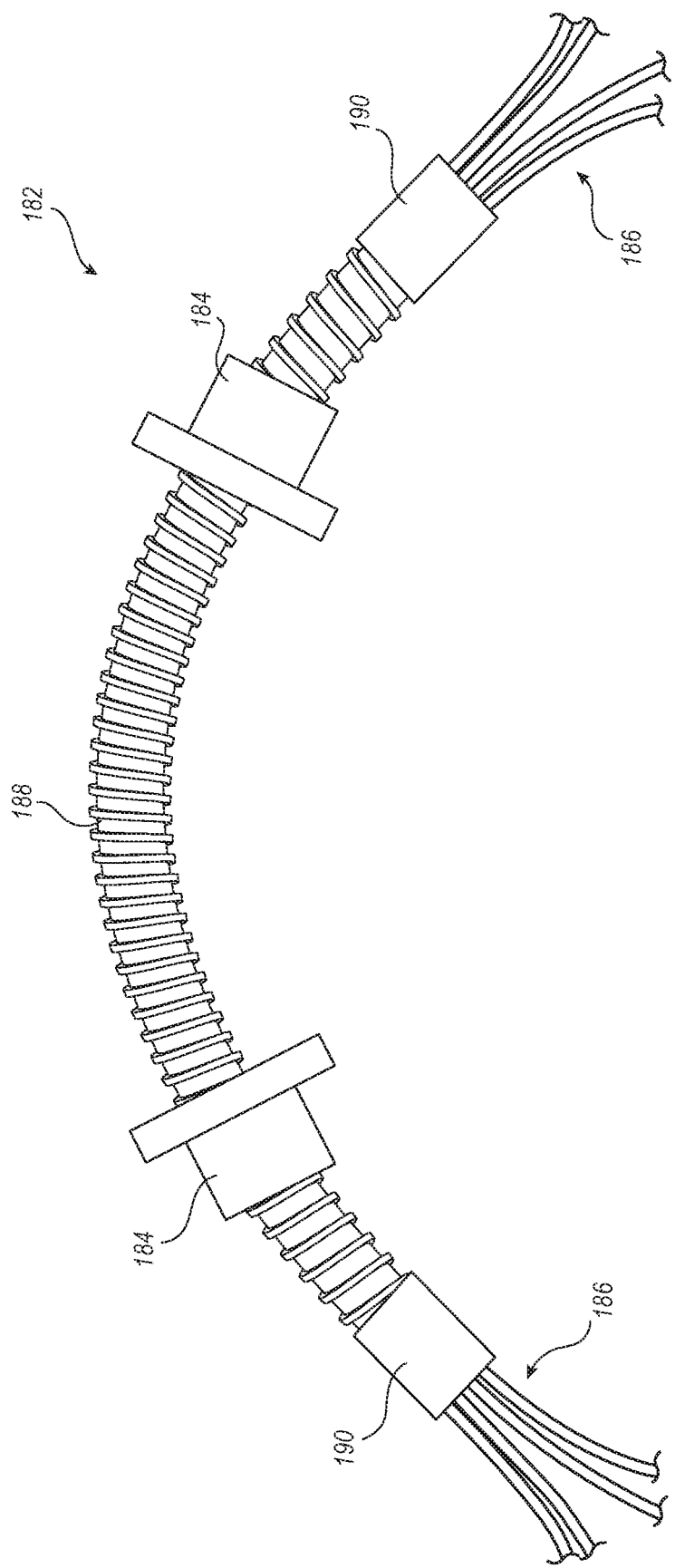
FIG. 22 depicts an embodiment of a power hinge jumper.

FIG. 22 illustrates an embodiment of a power hinge jumper 182 that includes a stainless-steel flex conduit 188, two grommets 184, and a plurality of electrical wires 186 that run through an inner passageway of the conduit 188. In addition, the conduit 188 may also include a cap 190 at each end. The caps 190 may prevent the conduit from being pulled out of the vertical supports 116 when two adjacent foldable wall modules 112a, 112b are in the full-open position, as seen in FIG. 21. In this way, electrical wires 186 can span from one foldable wall module 112 to another foldable wall module 112 while being protected from the outside environment by the conduit 188. In one embodiment, the conduit 188 may be made of another metal or other flexible material such as, but not limited to, plastic, rubber, silicone, or the like. In the illustrated embodiment, the conduit 188 may have an internal diameter of ⅜-inches. However, in one or more embodiments, the inner diameter of the conduit may be more or less than ⅜-inches. The inner diameter of the conduit 188 may be sufficient to allow a plurality of electrical wires 186 to pass therethrough.

Turning back to FIG. 19, one or more electrical components, such as the media screens 180a, 180b, can be powered through the electrical wires 186 that run through an internal space within each foldable wall module 112 and between the modules 112 through the power hinge jumpers 182a-c. The modular wall system 111 of FIG. 19 illustrates two media screens 180a, 180b, however other embodiments may include more or less than two media screens or other electrical components. It will be appreciated that other electronic components, such as speakers, screens, digital music players, projectors, computers, electrical outlets, and other electrical components may also be embedded or otherwise incorporated into the various foldable wall modules 112 of the modular wall system 111 and powered using the various embodiments of power hinge jumpers 182 and electrical wire 186 described herein.

It is noted that a wall, wall module, or modular wall, according to an implementation of the present invention may include, incorporate, or otherwise comprise properties, features, components, members, and/or elements described in other implementations, including systems, methods, products, devices, and/or implementations of the same disclosed herein. Thus, reference to a specific feature in relation to one implementation should not be construed as being limited to applications within said implementation.

The present invention may be embodied and/or implemented in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A foldable modular wall system, comprising:
a track;
one or more stationary wall modules connected to one or more connection features of the track, such that the one or more stationary wall modules do not move horizontally along the track, wherein the one or more stationary wall modules comprises a frame having opposing vertical support members and a plurality of horizontal support members; and
one or more movable wall modules, the one or more movable wall modules being pivotally and slidably connected to the track, such that the one or more movable wall modules can be selectively moved between a closed configuration and an open configuration.

2. The foldable modular wall system of claim 1, wherein the one or more movable wall modules comprises at least two movable wall modules that are hingedly connected to one another.

3. The foldable modular wall system of claim 2, wherein at least one of the two movable wall modules include an attachment feature that is configured to selectively maintain the movable wall modules in the closed configuration.

4. The foldable modular wall system of claim 3, wherein the attachment feature comprises a magnet connected to a vertical support of at least one of the two movable wall modules.

5. The foldable modular wall system of claim 3, wherein each of the at least two movable wall modules includes an attachment feature.

6. The foldable modular wall system of claim 1, wherein the one or more movable wall modules comprises at least two foldable wall modules that are hingedly connected to one another.

7. The foldable modular wall system of claim 1, wherein the one or more movable wall modules comprises a first movable wall module that is hingedly connected to a first stationary wall module of the one or more stationary wall modules.

8. The foldable modular wall system of claim 1, wherein at least one movable wall module of the one or more movable wall modules comprises a selectively, horizontally extendable end cap.

9. The foldable modular wall system of claim 8, wherein the end cap is connected to a vertical support of the at least one movable wall module by an extension bracket.

10. The foldable modular wall system of claim 9, wherein the extension bracket comprises a first connection bracket connected to the end cap, a second connection bracket connected to the vertical support, and a hinge connector hingedly connected between the first and second connection brackets.

11. The foldable modular wall system of claim 1, further comprising one or more electronic components embedded in or on at least one of the one or more movable wall modules.

12. The foldable modular wall system of claim 11, wherein the one or more electronic components comprises a media screen.

13. A modular wall system connected to a permanent or fixed-in-place structure, comprising:
a track comprising a top side and a bottom side, wherein the top side of the track is configured to be removably secured to a permanent or fixed-in-place ceiling; and
two or more foldable wall modules, the two or more foldable wall modules being pivotally and slidably connected to the bottom side of the track such that the two or more foldable wall modules can be selectively moved between a closed configuration and an open configuration;
wherein:
each of the two or more wall modules comprises a frame comprising opposing vertical support members, a plurality of horizontal support members extending therebetween, and an exterior wall element attached to the frame; and
at least one foldable wall module of the two or more foldable wall modules comprises a selectively extendable end cap that extends horizontally outward from one of the opposing vertical support members in a same plane as the at least one foldable wall module, wherein the selectively extendable end cap is operable to seal a gap between the at least one foldable module and another wall module.

14. The modular wall system of claim 13, further comprising:
a stationary wall module connected to the track, wherein the stationary wall module is separate from the permanent or fixed-in-place structure;
wherein the end cap is selectively extendable against the stationary wall module.

15. The modular wall system of claim 13, wherein each of the foldable wall modules comprises a vertical support.

16. The modular wall system of claim 15, further comprising an attachment feature connected to at least one of two adjacent vertical supports of two or more adjacent foldable wall modules.

17. The modular wall system of claim 16, wherein the attachment feature comprises a magnet.

18. The modular wall system of claim 15, further comprising a power hinge jumper connected between two adjacent foldable wall modules.

19. The modular wall system of claim 18, wherein the power hinge jumper comprises a flexible conduit assembly mounted to opposing vertical supports of the two adjacent foldable wall modules.

20. The modular wall system of claim 19, wherein the flexible conduit assembly comprises a high-flex stainless steel conduit and one or more electrical wires disposed within the conduit and extending from one adjacent foldable wall module to the other adjacent foldable wall module through the conduit.

21. The foldable modular wall system of claim 13, further comprising one or more electronic components embedded in or on at least one of the two or more foldable wall modules.

22. The foldable modular wall system of claim 21, wherein the one or more electronic components comprises a media screen.

23. The modular wall system of claim 15, further comprising a noise dampening element disposed on a vertical support of at least one of the foldable wall modules.

24. A foldable modular wall system, comprising:
a track removably secured to a permanent or fixed-in-place ceiling;
two or more movable wall modules connected to the track and extending vertically downward from the track, each movable wall module being hingedly connected to at least one adjacent movable wall module;
one or more electronic components embedded within or on at least one of the two or more movable wall modules; and
a selectively extendable end cap connected to at least one of the two or more movable wall modules, wherein the selectively extendable end cap extends horizontally from the at least one movable wall module in a same plane as the at least one foldable wall module, wherein the selectively extendable end cap is operable to seal a gap between the at least one foldable module and another wall module.

25. The foldable modular wall system of claim 24, wherein the one or more electronic components comprises a media screen.

26. The foldable modular wall system of claim 24, further comprising at least one flexible power hinge jumper spanning two adjacent movable wall modules through which electrical wires may pass to provide electrical power to the one or more electronic components.

27. The foldable modular wall system of claim 24, further comprising one or more stationary wall modules removably attached to the track and extending from the track towards a floor.

28. The foldable modular wall system of claim 24, further comprising:

a stationary wall module connected to the track;

wherein:

each of the stationary wall module and two or more movable wall modules comprise a frame comprising opposing vertical support members, a plurality of horizontal support members extending therebetween, and an exterior wall element attached to the frame; and the extendable cap extends horizontally from one of the opposing vertical support members of the at least one movable wall module toward a vertical support member of the stationary wall module.

29. The foldable modular wall system of claim 24, further comprising one or more attachment features configured to secure the two or more movable wall modules together in a closed wall configuration.

* * * * *